(12) United States Patent
Onoda

(10) Patent No.: US 11,969,820 B2
(45) Date of Patent: Apr. 30, 2024

(54) LASER PROCESSING APPARATUS

(71) Applicant: Keyence Corporation, Osaka (JP)

(72) Inventor: Junya Onoda, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 729 days.

(21) Appl. No.: 17/102,566

(22) Filed: Nov. 24, 2020

(65) Prior Publication Data

US 2021/0197313 A1  Jul. 1, 2021

(30) Foreign Application Priority Data

Dec. 26, 2019 (JP) ................................. 2019-236651

(51) Int. Cl.
| | |
|---|---|
| *G05B 19/402* | (2006.01) |
| *B23K 26/03* | (2006.01) |
| *B23K 26/042* | (2014.01) |
| *B23K 26/046* | (2014.01) |
| *B23K 26/06* | (2014.01) |

(Continued)

(52) U.S. Cl.
CPC .......... *B23K 26/042* (2015.10); *B23K 26/032* (2013.01); *B23K 26/046* (2013.01); *B23K 26/0665* (2013.01); *B23K 26/359* (2015.10); *G05B 19/402* (2013.01); *B23K 26/082* (2015.10); *G05B 2219/40623* (2013.01)

(58) Field of Classification Search
CPC .. B23K 26/042; B23K 26/032; B23K 26/046; B23K 26/0665; B23K 26/359; B23K 26/082; G05B 19/402; G05B 2219/40623
See application file for complete search history.

(56) References Cited

U.S. PATENT DOCUMENTS

2008/0094643 A1\* 4/2008 Nishio ................. G01B 11/026
356/623
2020/0209523 A1 7/2020 Nehashi et al.

FOREIGN PATENT DOCUMENTS

| JP | 2008227377 A | 9/2008 |
|---|---|---|
| JP | 20156674 A | 1/2015 |
| JP | 2015078852 A \* | 4/2015 |

(Continued)

OTHER PUBLICATIONS

U.S. Appl. No. 17/176,197, filed Feb. 16, 2021 (142 pages).

(Continued)

*Primary Examiner* — Michael W Choi
(74) *Attorney, Agent, or Firm* — Kilyk & Bowersox, P.L.L.C.

(57) ABSTRACT

High processing accuracy of a workpiece is maintained even if the workpiece is misaligned. A laser processing apparatus includes: a setting section that sets a pattern area and a distance measurement position on a captured image; a condition setting storage section that stores image information in the pattern area; a position correction section that detects a misalignment of a new workpiece different from a workpiece used to set the pattern area and corrects the distance measurement position on the new workpiece; a distance measurement section that measures a distance based on a light reception position of distance measuring light in a distance measuring light receiving section; and a Z scanner that adjusts a focal position based on a measurement result of the distance measurement section prior to irradiation of the workpiece with laser light.

7 Claims, 29 Drawing Sheets

(51) Int. Cl.
*B23K 26/359* (2014.01)
*B23K 26/082* (2014.01)

(56) References Cited

FOREIGN PATENT DOCUMENTS

| | | | |
|---|---|---|---|
| JP | 201636841 A | | 3/2016 |
| JP | 2016036841 A | * | 3/2016 |
| JP | 2018140426 A | | 9/2018 |
| WO | WO-2013038606 A1 | * | 3/2013 ........... B23K 26/032 |

OTHER PUBLICATIONS

Office Action issued in corresponding Japanese Patent Application No. 2019-236651 dated Jun. 20, 2023 (English translation only) (3 pages).

* cited by examiner

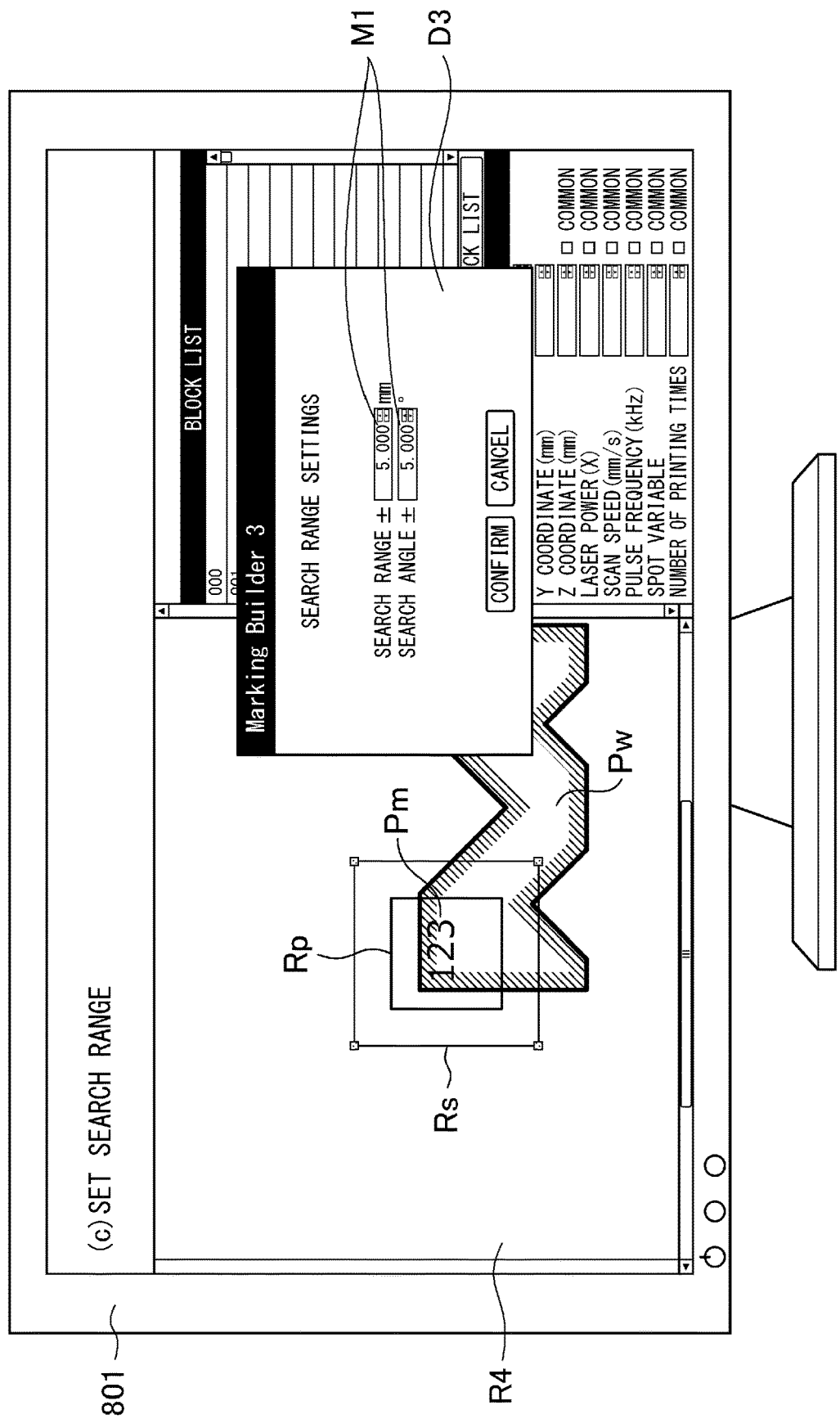

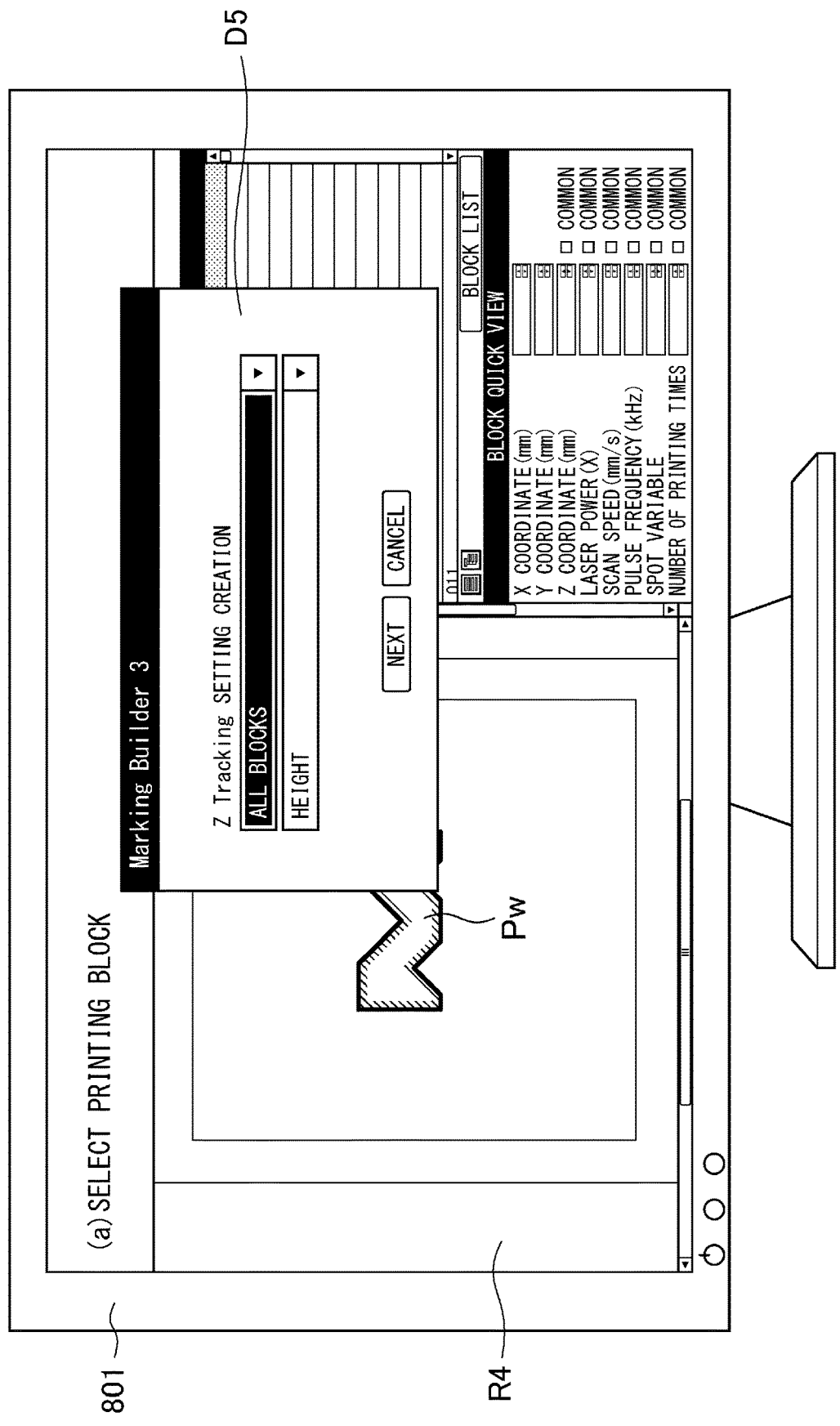

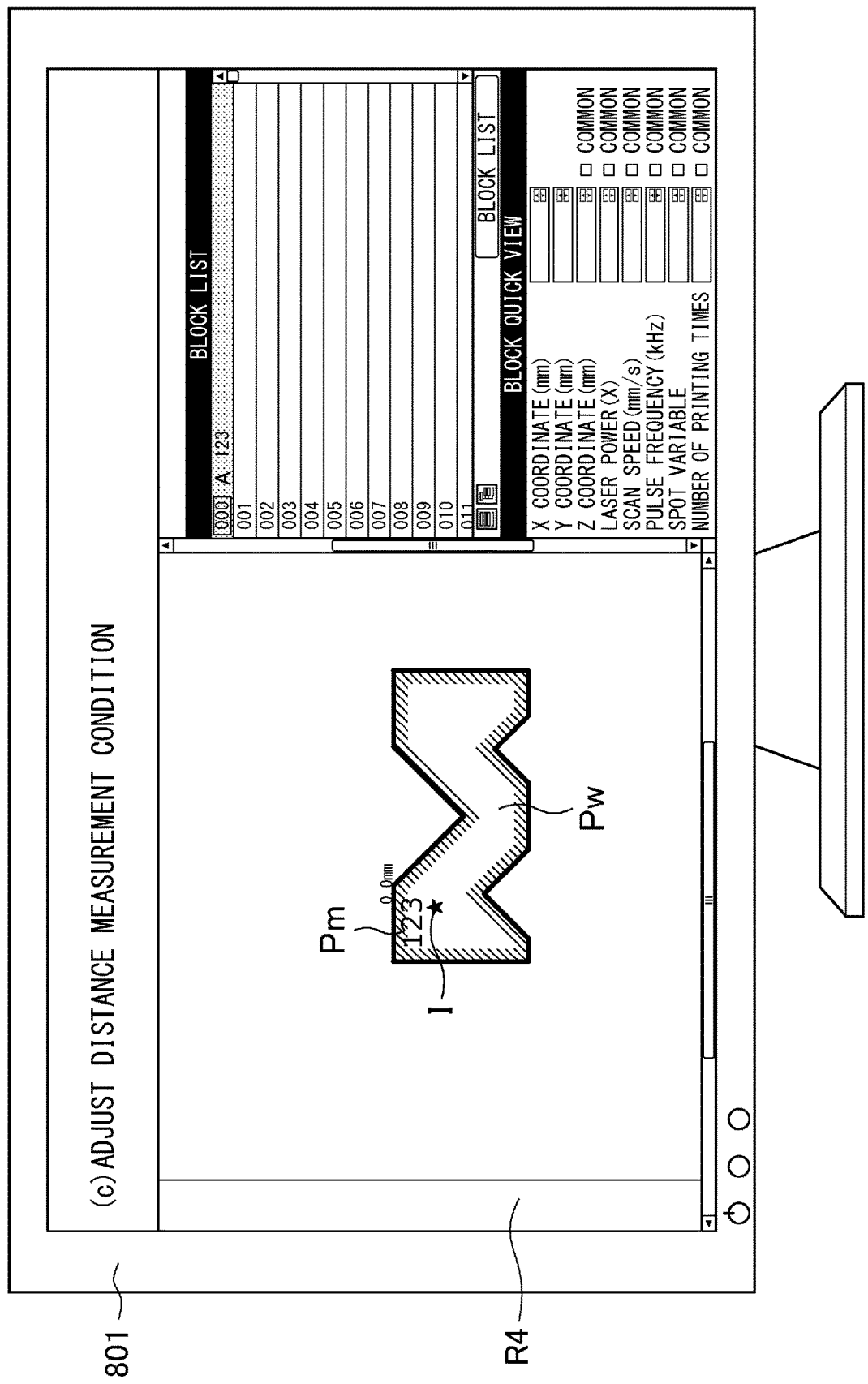

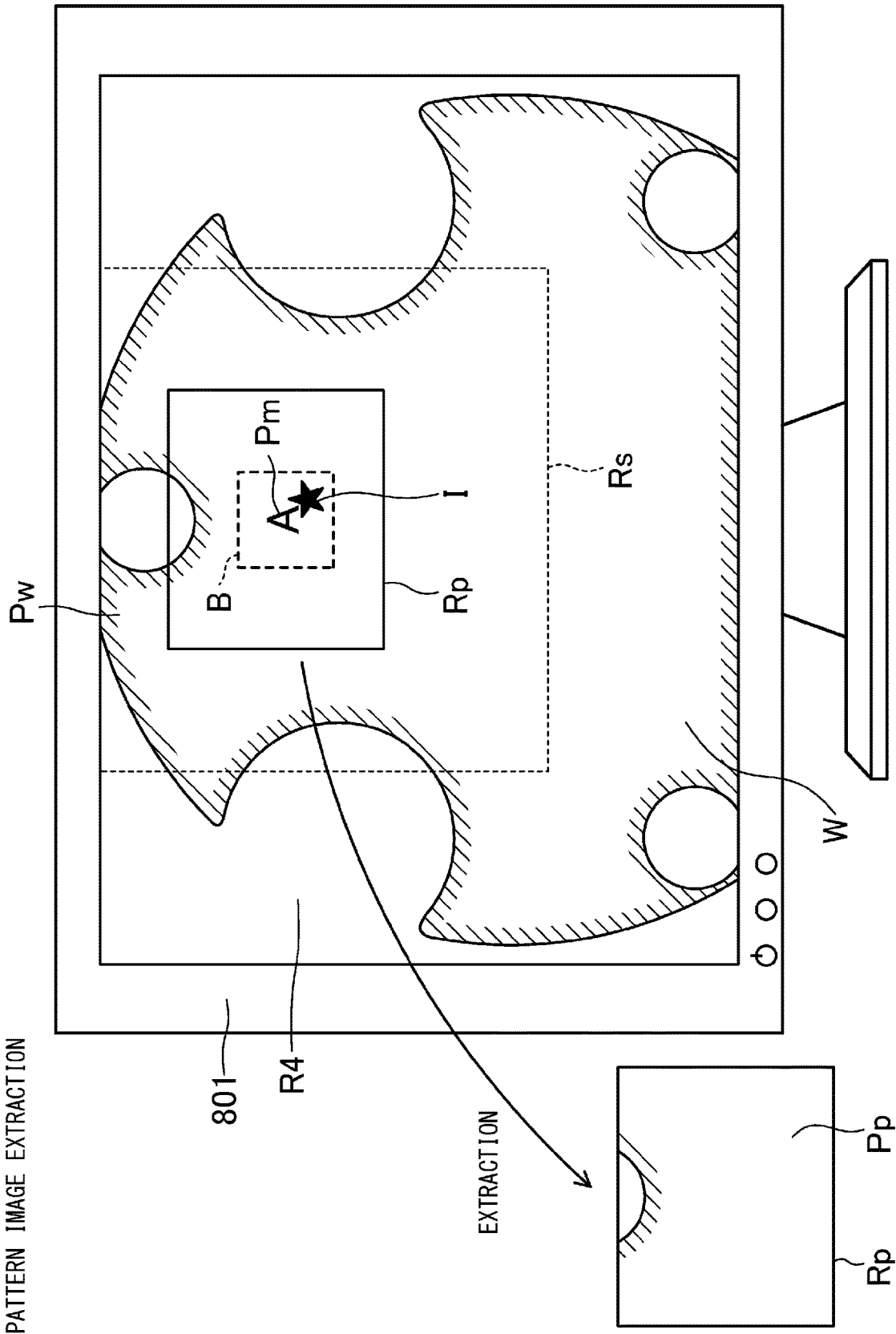
FIG. 17A  PATTERN IMAGE EXTRACTION

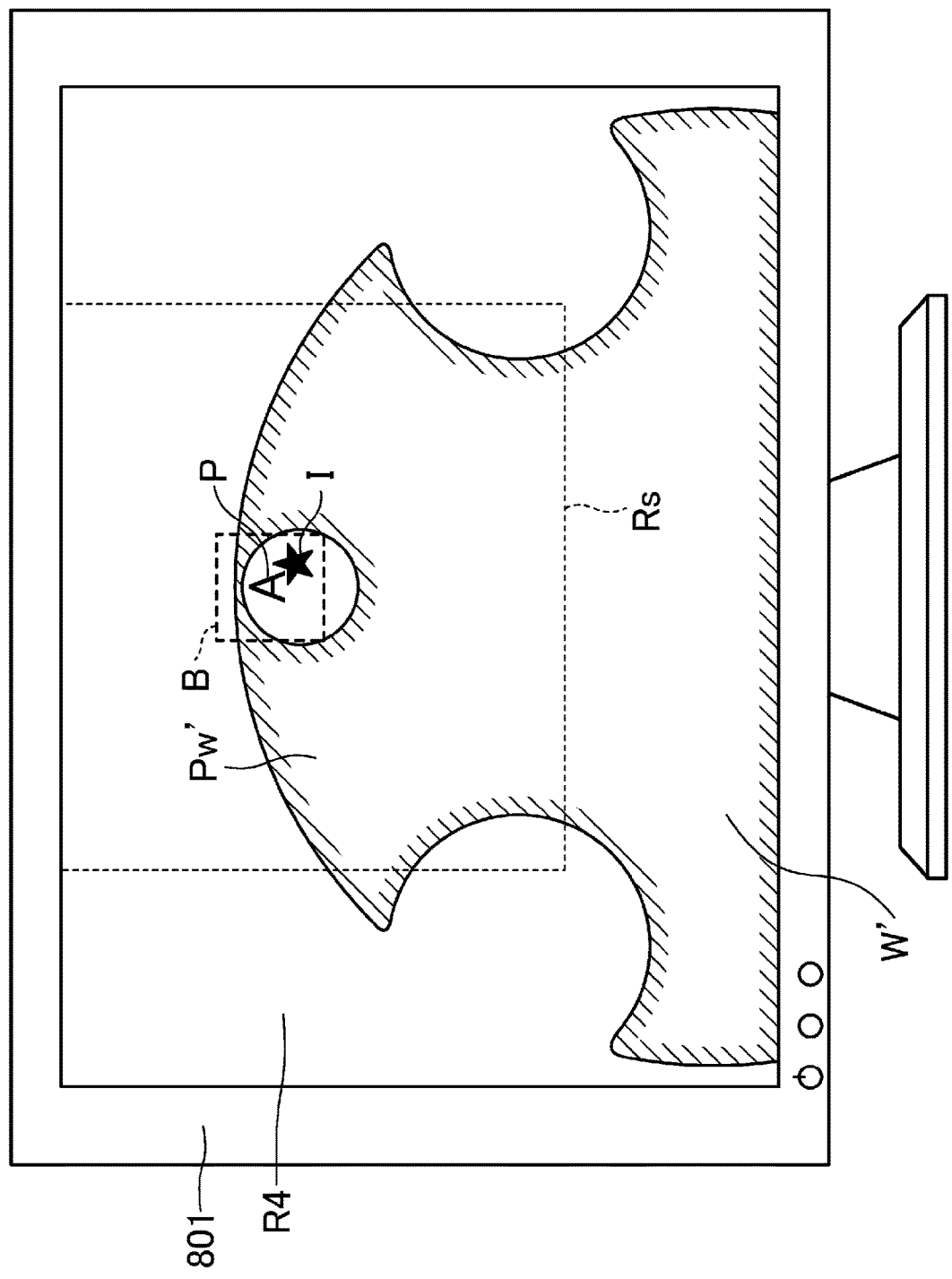
FIG. 17B LINE OPERATION (OCCURRENCE OF MISALIGNMENT)

PATTERN SEARCH

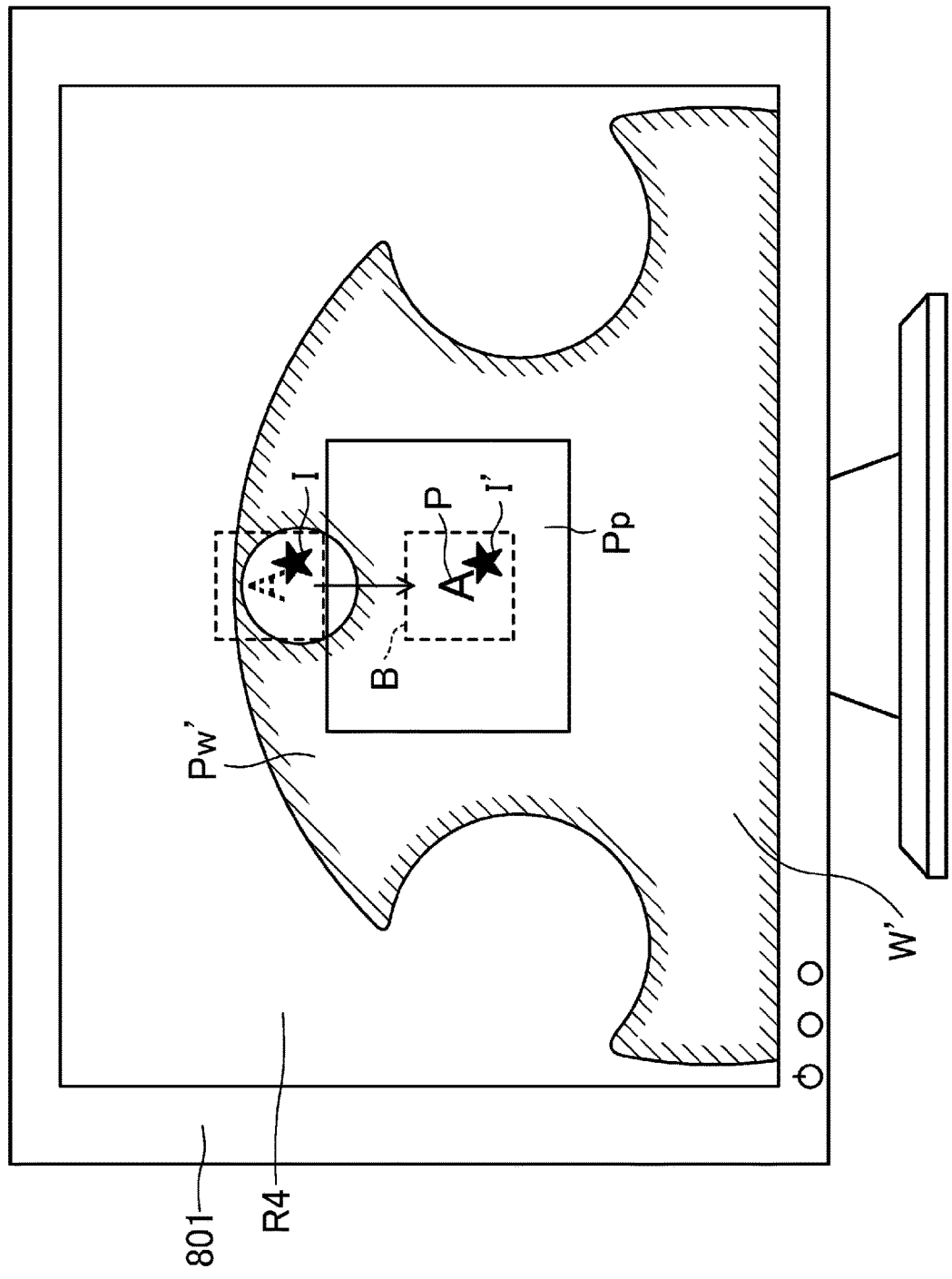
FIG. 17D  MISALIGNMENT CORRECTION

LASER PROCESSING APPARATUS

CROSS-REFERENCE TO RELATED APPLICATIONS

The present application claims foreign priority based on Japanese Patent Application No. 2019-236651, filed Dec. 26, 2019, the contents of which are incorporated herein by reference.

BACKGROUND OF THE INVENTION

1. Field of the Invention

The technique disclosed herein relates to a laser processing apparatus such as a laser marking apparatus that performs processing by irradiating a workpiece with laser light.

2. Description of Related Art

Conventionally, there is known a laser processing apparatus capable of correcting a processing position by laser light.

For example, Japanese Patent Laid-Open No. 2015-006674 discloses a laser processing apparatus configured to forming a hole in a workpiece in which the amount of deviation of a center position of the hole is calculated and an angle of a galvano mirror is corrected based on the amount of deviation thus calculated.

Further, a laser processing apparatus disclosed in Japanese Patent Laid-Open No. 2008-227377 can adjust a focal position of laser light along a Z-axis direction in order to perform laser processing on a workpiece having a predetermined height.

However, such a correction method in Japanese Patent Laid-Open No. 2015-006674 merely corrects a position on a two-dimensional plane.

In this correction method, the processing accuracy is likely to decrease when a workpiece having a height is set as an object to be processed as disclosed in Japanese Patent Laid-Open No. 2008-227377.

For example, a focal position of laser light differs between the vicinity of the center of a processing area set on the workpiece and the vicinity of an edge of the processing area in the case of two-dimensional scanning using a galvano mirror. Specifically, the focal position becomes more distant from the processing area as proceeding toward the edge from the central portion of the processing area. Therefore, the focal position is likely to deviate after the correction in the position correction on the two-dimensional plane. This is problematic in terms of maintaining high processing accuracy.

SUMMARY OF THE INVENTION

The technique disclosed herein has been made in view of this point, and an object thereof is to maintain high processing accuracy of a workpiece even if the workpiece is misaligned.

Specifically, according to one embodiment of the present disclosure, a laser processing apparatus includes: an excitation light generation section that generates excitation light; a laser light output section that generates laser light based on the excitation light generated by the excitation light generation section and emits the laser light; a focus adjustment section that adjusts a focal position of the laser light emitted from the laser light output section; and a laser light scanning section that irradiates a workpiece with laser light whose focal position has been adjusted by the focus adjustment section and performs two-dimensional scanning within a processing area set on a surface of the workpiece.

According to the embodiment of the present disclosure, the laser processing apparatus includes: an imaging section that captures the workpiece to generate a captured image including at least a part of the processing area; a setting section that sets each of a correction area for identification of a position of the workpiece and a distance measurement position for measurement of a distance to the surface of the workpiece on the captured image; a storage section that stores image information in the correction area set by the setting section; and a position correction section that detects a misalignment of a new workpiece using the image information stored in the storage section on a captured image newly generated by the imaging section for the new workpiece different from the workpiece used to set the correction area, and corrects a distance measurement position on the new workpiece corresponding to the distance measurement position set by the setting section.

The laser processing apparatus further includes: a distance measuring light emitting section that emits distance measuring light for measurement of a distance from the laser processing apparatus to a surface of the new workpiece; a scanning control section that controls the laser light scanning section such that the distance measurement position corrected by the position correction section is irradiated with the distance measuring light emitted by the distance measuring light emitting section; a distance measuring light receiving section that receives the distance measuring light which has been reflected on the surface of the new workpiece and returned via the laser light scanning section; and a distance measurement section that measures a distance from the laser processing apparatus to the distance measurement position corrected by the position correction section based on a light reception position of the distance measuring light in the distance measuring light receiving section, and the focus adjustment section adjusts a focal position based on a measurement result of the distance measurement section prior to irradiation of the new workpiece with laser light.

Here, the "image information" may be the captured image itself or edge information extracted from the captured image.

According to the above configuration, the laser processing apparatus can detect the misalignment of the workpiece with the position correction section and correct the distance measurement position based on the detection result. The laser processing apparatus corrects the focal position based on the measurement result of the distance measurement section in a state where the distance measurement position has been corrected by the position correction section prior to the irradiation of the workpiece with the laser light.

In this manner, the high processing accuracy can be maintained even if the workpiece is misaligned with the configuration in which the focal position is adjusted in the state where the misalignment of the workpiece has been corrected.

Further, according to another embodiment of the present disclosure, the scanning control section may control the laser light scanning section so as to perform two-dimensional scanning in consideration of the misalignment detected by the position correction section.

According to such a configuration, the scanning control section executes the two-dimensional scanning in consideration of the misalignment. This is advantageous in terms of maintaining the high processing accuracy of the workpiece.

According to still another embodiment of the present disclosure, the laser processing apparatus may further include a processing block setting section that sets a processing block, which indicates a position of a processing pattern formed within the processing area and is associated with the distance measurement position, to overlap with the captured image, and the position correction section may correct a position of the processing block based on a detection result of the misalignment.

According to such a configuration, the distance measurement position associated with the processing block can be corrected by correcting the position of the processing block. This is advantageous in terms of maintaining the high processing accuracy of the workpiece.

Further, according to still another embodiment of the present disclosure, the setting section may set the distance measurement position within the processing block.

According to such a configuration, it is advantageous in terms of more appropriately setting the distance measurement position and further maintaining the high processing accuracy of the workpiece.

Further, according to still another embodiment of the present disclosure, the imaging section may include at least one of a first imaging section, which has an imaging optical axis branching from a laser light path from the laser light output section to the laser light scanning section and generates the captured image with the laser light scanning section, and a second imaging section, which has an imaging optical axis independent of the laser light path and generates the captured image without the laser light scanning section, and the position correction section may correct the distance measurement position based on a captured image newly generated by at least one of the first and second imaging sections.

According to such a configuration, it is advantageous in terms of more accurately correcting the distance measurement position and further maintaining the high processing accuracy of the workpiece.

As described above, the high processing accuracy can be maintained even when the workpiece is misaligned according to the laser processing apparatus.

BRIEF DESCRIPTION OF THE DRAWINGS

FIG. 14C is a view illustrating the specific procedure for setting the search conditions;

FIG. 15A is a view illustrating a specific procedure for setting distance measurement conditions;

FIG. 15C is a view illustrating the specific procedure for setting the distance measurement conditions;

FIG. 17A is a view illustrating a specific procedure of pattern search;

FIG. 17B is a view illustrating the specific procedure of the pattern search;

FIG. 17D is a view illustrating the specific procedure of the pattern search;

DETAILED DESCRIPTION OF PREFERRED EMBODIMENTS

Hereinafter, embodiments of the present disclosure will be described with reference to the drawings. Note that the following description is given as an example.

That is, a laser marker is described as an example of a laser processing apparatus in the present specification, but the technique disclosed herein can be applied to general laser-applied devices regardless of the names of the laser processing apparatus and the laser marker.

Although printing will be described as a typical example of processing in this specification, the technique can be used in various types of processing using laser light such as image marking without being limited to the printing.

<Overall Configuration>

Figure 1:
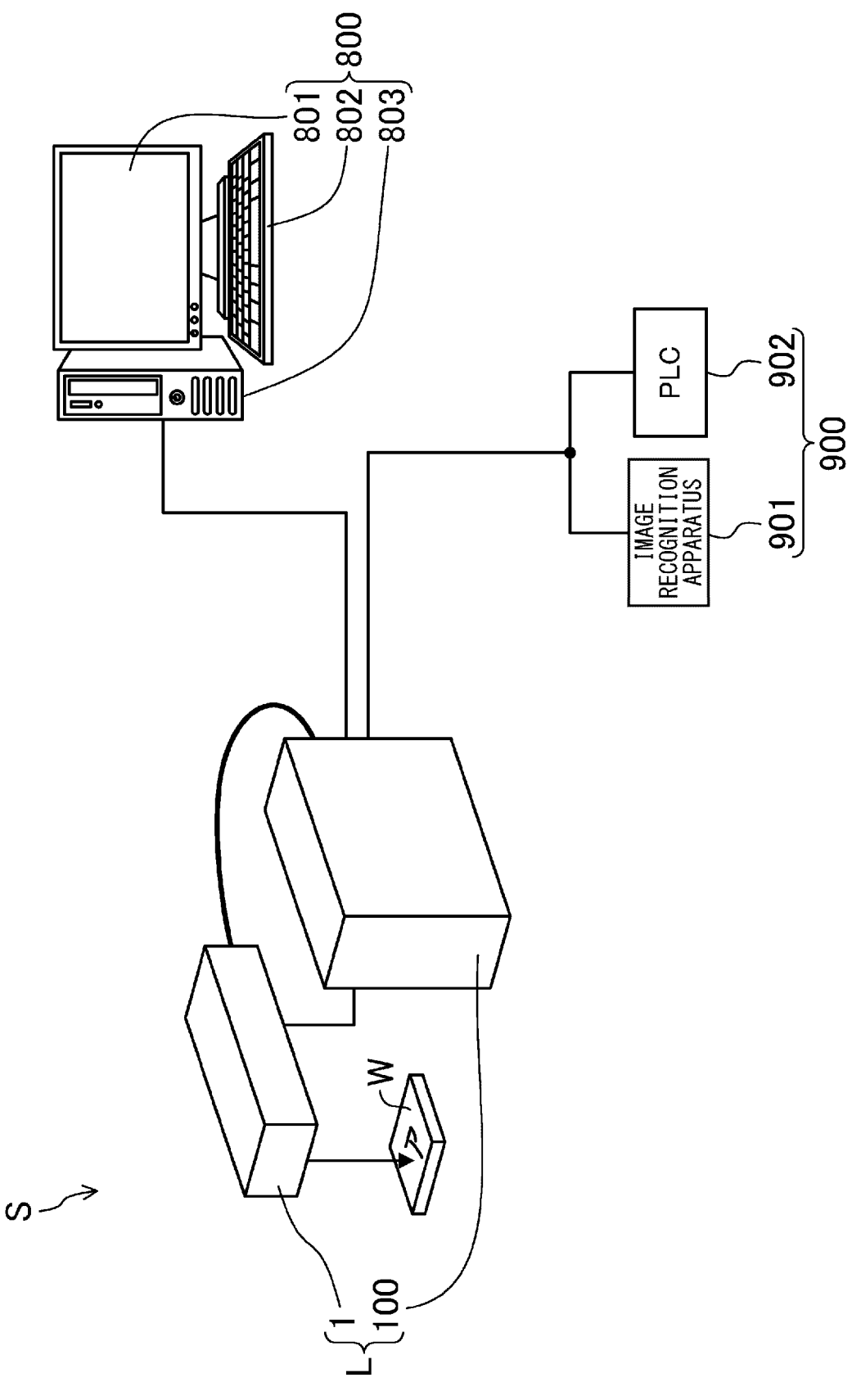
FIG. 1 is a diagram illustrating an overall configuration of a laser processing system.
Figure 2:
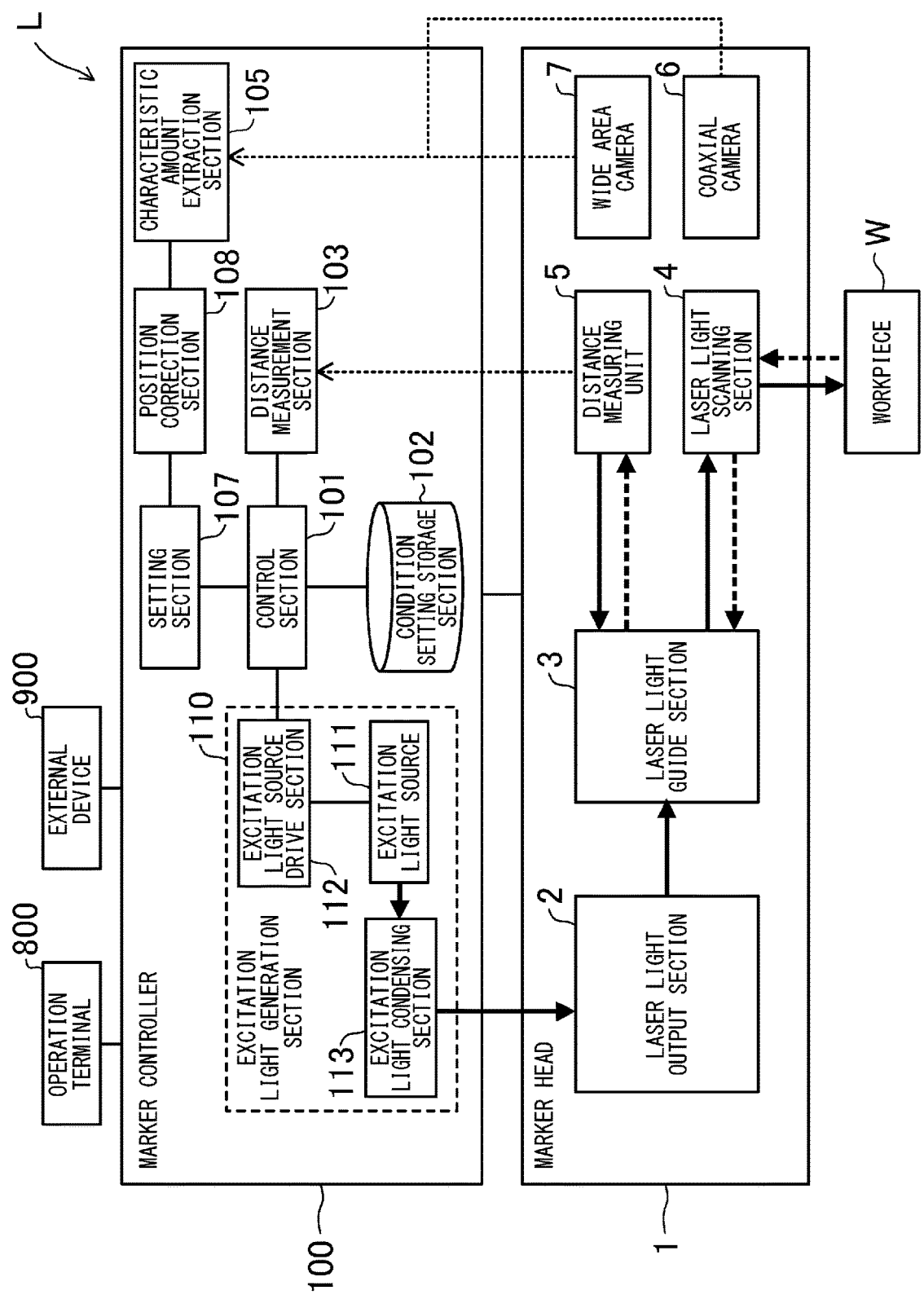
FIG. 2 is a block diagram illustrating a schematic configuration of a laser processing apparatus.

FIG. 1 is a diagram illustrating an overall configuration of a laser processing system S, and FIG. 2 is a diagram illustrating a schematic configuration of a laser processing apparatus L in the laser processing system S. The laser processing system S illustrated in FIG. 1 includes the laser processing apparatus L, an operation terminal 800 connected to the laser processing apparatus L, and an external device 900.

The laser processing apparatus L illustrated in FIGS. 1 and 2 irradiates a workpiece W, which is the workpiece, with laser light emitted from a marker head 1 and performs three-dimensional scanning on a surface of the workpiece W to perform processing. The "three-dimensional scanning" here indicates a concept that collectively refers to a combination of a two-dimensional operation of scanning an irradiation position of laser light on the surface of the workpiece W (so-called "two-dimensional scanning") and a one-dimensional operation of adjusting a focal position of laser light.

In particular, the laser processing apparatus L according to this embodiment can emit laser light having a wavelength near 1064 nm as the laser light for processing the workpiece W. This wavelength corresponds to a near-infrared (NIR) wavelength range. Therefore, the laser light for processing the workpiece W is sometimes referred to as "near-infrared laser light" to be distinguished from other laser light in the following description. It is a matter of course that laser light having another wavelength may be used for the processing of the workpiece W.

The laser processing apparatus L according to this embodiment can measure a distance to the workpiece W (height of the workpiece W) with a distance measuring unit 5 built in the marker head 1 and also adjust a focal position of the near-infrared laser light using the measurement result.

As illustrated in FIGS. 1 and 2, the laser processing apparatus L includes the marker head 1 configured to emit laser light and a marker controller 100 configured to control the marker head 1.

The marker head 1 and the marker controller 100 are separate members in this embodiment, and are electrically connected via an electrical wiring and optically coupled via an optical fiber cable.

More typically, one of the marker head 1 and the marker controller 100 can be incorporated into the other to be integrated. In this case, the optical fiber cable or the like can be omitted as appropriate.

The operation terminal 800 has, for example, a central processing unit (CPU) and a memory, and is connected to the marker controller 100. The operation terminal 800 functions as a terminal configured to set various processing conditions (also referred to as printing conditions) such as printing settings and to display information related to laser processing to a user. The operation terminal 800 includes a display section 801 configured to display information to the user, an operation section 802 that receives an operation input from the user, and a storage apparatus 803 configured to store various types of information.

Specifically, the display section 801 is configured using, for example, a liquid crystal display or an organic EL panel. The display section 801 displays an operation status and processing conditions of the laser processing apparatus L as the information related to laser processing. On the other hand, the operation section 802 is configured using, for example, a keyboard and/or a pointing device. Here, the pointing device includes a mouse and/or a joystick. The operation section 802 is configured to receive the operation input from the user, and is used to operate the marker head 1 via the marker controller 100.

The operation terminal 800 configured as described above can set processing conditions in laser processing based on the operation input from the user. Examples of the processing conditions include at least one or more item of a character string that needs to be printed on the workpiece W, a graphic content (marking pattern) such as a barcode and a QR code (registered trademark), an output (target output) required for laser light, and scanning speed (scan speed) of laser light on the workpiece W.

The processing conditions according to this embodiment also include conditions and parameters related to the distance measuring unit 5 (hereinafter, also referred to as "distance measurement conditions"). Examples of the distance measurement conditions include data associating a signal indicating a detection result of the distance measuring unit 5 with a distance to the surface of the workpiece W.

The processing conditions set by the operation terminal 800 are output to the marker controller 100 and stored in a condition setting storage section 102. The storage apparatus 803 in the operation terminal 800 may store the processing conditions as necessary.

Note that the operation terminal 800 can be integrated into the marker controller 100, for example. In this case, a name such as a control unit is used instead of the "operation terminal", but the operation terminal 800 and the marker controller 100 are members separated from each other at least in this embodiment.

The external device 900 is connected to the marker controller 100 of the laser processing apparatus L as necessary. In the example illustrated in FIG. 1, an image recognition apparatus 901 and a programmable logic controller (PLC) 902 are provided as the external device 900.

Specifically, the image recognition apparatus 901 determines a type and a position of the workpiece W conveyed on a manufacturing line, for example. As the image recognition apparatus 901, for example, an image sensor can be used. The PLC 902 is used to control the laser processing system S according to a predetermined sequence.

In addition to the above-described devices and apparatuses, an apparatus configured to perform operation and control, a computer configured to perform various other processes, a storage apparatus, a peripheral device, and the like can be connected to the laser processing apparatus L. The connection in this case may be serial connection such as IEEE1394, RS-232, RS-422 and USB, or parallel connection. Alternatively, electrical, magnetic, or optical connection can be adopted via a network such as 10BASE-T, 100BASE-TX, and 1000BASE-T. In addition to the wired connection, a wireless connection using a wireless LAN such as IEEE802, radio waves such as Bluetooth (registered trademark), infrared rays, or optical communication may be used. For example, various memory cards, magnetic disks, magneto-optical disks, semiconductor memories, hard disks, and the like can be used as a storage medium used for the storage apparatus configured for data exchange, storage of various settings, and the like.

Hereinafter, a hardware configuration of each of the marker controller 100 and the marker head 1 and a configuration related to the control of the marker head 1 by the marker controller 100 will be described in order.

<Marker Controller 100>

As illustrated in FIG. 2, the marker controller 100 includes: the condition setting storage section 102 that stores the processing conditions; a control section 101 that controls the marker head 1 based on the processing conditions stored in the condition setting storage section 102; and an excitation light generation section 110 that generates laser excitation light (excitation light).

(Condition Setting Storage Section 102)

The condition setting storage section 102 is configured to store the processing conditions set using the operation terminal 800 and to output the stored processing conditions to the control section 101 as necessary.

Specifically, the condition setting storage section 102 is configured using a volatile memory, a non-volatile memory, a hard disk drive (HDD), a solid state drive (SSD), or the like, and can temporarily or consistently store information indicating the processing conditions. When the operation terminal 800 is incorporated in the marker controller 100, the storage apparatus 803 can be configured to also serve as the condition setting storage section 102.

(Control Section 101)

The control section 101 controls at least the excitation light generation section 110 in the marker controller 100, a laser light output section 2, and a laser light guide section 3, a laser light scanning section 4, the distance measuring unit 5, a coaxial camera 6, and a wide area camera (non-coaxial camera) 7 in the marker head 1 based on the processing conditions stored in the condition setting storage section 102 to execute printing on the workpiece W.

Specifically, the control section 101 has a CPU, a memory, and an input/output bus, and generates a control signal based on a signal indicating information input via the operation terminal 800 and a signal indicating the processing conditions read from the condition setting storage section 102. The control section 101 outputs the control signal thus generated to each section of the laser processing apparatus L to control the printing on the workpiece W and the measurement of the distance to the workpiece W.

For example, when starting processing of the workpiece W, the control section 101 reads a target output stored in the condition setting storage section 102, outputs a control signal generated based on the target output to an excitation light source drive section 112, and controls the generation of laser excitation light.

When actually processing the workpiece W, the control section 101 reads, for example, a processing pattern (marking pattern) stored in the condition setting storage section 102, outputs a control signal generated based on the processing pattern to the laser light scanning section 4, and two-dimensionally scans near-infrared laser light.

In this manner, the control section 101 can control the laser light scanning section 4 so as to realize the two-dimensional scanning of the near-infrared laser light. The control section 101 is an example of the "scanning control section" in this embodiment.

(Excitation Light Generation Section 110)

The excitation light generation section 110 includes: an excitation light source 111 that generates laser light according to a driving current; the excitation light source drive section 112 that supplies the driving current to the excitation light source 111; and an excitation light condensing section 113 optically coupled to the excitation light source 111. The excitation light source 111 and the excitation light condensing section 113 are fixed in an excitation casing (not illustrated). Although not described in detail, this excitation casing is made of metal such as copper having excellent thermal conductivity, and can efficiently dissipate heat from the excitation light source 111.

Hereinafter, the respective sections of the excitation light generation section 110 will be described in order.

The excitation light source drive section 112 supplies a driving current to the excitation light source 111 based on the control signal output from the control section 101. Although not described in detail, the excitation light source drive section 112 determines a driving current based on the target output determined by the control section 101, and supplies the driving current thus determined to the excitation light source 111.

The excitation light source 111 is supplied with a driving current from the excitation light source drive section 112 and oscillates laser light according to the driving current. For example, the excitation light source 111 is configured using a laser diode (LD) or the like, and an LD array or an LD bar in which a plurality of LD elements are linearly arrayed can be used. When the LD array or the LD bar is used as the excitation light source 111, laser light oscillated from each element is output in a line and enters the excitation light condensing section 113.

The excitation light condensing section 113 condenses the laser light output from the excitation light source 111 and outputs the condensed laser light as laser excitation light (excitation light). For example, the excitation light condensing section 113 is configured using a focusing lens or the like, and has an incident surface on which laser light is incident and an emission surface from which the laser excitation light is output. The excitation light condensing section 113 is optically coupled to the marker head 1 via the optical fiber cable described above. Accordingly, the laser excitation light output from the excitation light condensing section 113 is guided to the marker head 1 via the optical fiber cable.

The excitation light generation section 110 can be configured as an LD unit or an LD module in which the excitation light source drive section 112, the excitation light source 111, and the excitation light condensing section 113 are incorporated in advance. The excitation light emitted from the excitation light generation section 110 (specifically, the laser excitation light output from the excitation light condensing section 113) can be unpolarized, so that it is unnecessary to consider a change in the polarization state, which is advantageous in terms of design. In particular, regarding the configuration in the periphery of the excitation light source 111, it is preferable to provide a mechanism that makes output light unpolarized in the LD unit itself which outputs light obtained from an LD array in which dozens of LD elements are arranged using an optical fiber, as a bundle.

(Other Constituent Elements)

The marker controller 100 also has a distance measurement section 103 that measures a distance to the workpiece W using the distance measuring unit 5. The distance measurement section 103 is electrically connected to the distance measuring unit 5 and can receive a signal related to a measurement result of the distance measuring unit 5 (at least, a signal indicating a light reception position of distance measuring light in a distance measuring light receiving section 5B).

The laser processing apparatus L according to this embodiment further includes the coaxial camera 6 and the wide area camera 7 as the non-coaxial camera as will be described later. This laser processing apparatus L can capture the surface of the workpiece W by operating at least one of the coaxial camera 6 and the wide area camera 7.

The control section 101 in the marker controller 100 includes a characteristic amount extraction section 105 and a position correction section 108 to perform processing based on an image captured by at least one of the coaxial camera 6 and the wide area camera 7.

The marker controller 100 also includes a setting section 107 that sets information on a marking pattern. The control section 101 serving as a scanning control section reads and uses a setting content of the setting section 107.

Note that the distance measurement section 103, the characteristic amount extraction section 105, and the position correction section 108 may be configured using the control section 101. For example, the control section 101 may also serve as the position correction section 108. Further, the position correction section 108 may also serve as the characteristic amount extraction section 105 and the like.

Details of the distance measurement section 103, the characteristic amount extraction section 105, the setting section 107, and the position correction section 108 will be described later.

<Marker Head 1>

As described above, the laser excitation light generated by the excitation light generation section 110 is guided to the marker head 1 via the optical fiber cable. The marker head 1 includes: the laser light output section 2 that amplifies and generates laser light based on the laser excitation light and outputs the laser light; the laser light scanning section 4 that irradiates the surface of the workpiece W with the laser light output from the laser light output section 2 to perform two-dimensional scanning; the laser light guide section 3 that forms an optical path from the laser light output section 2 to the laser light scanning section 4; the distance measuring unit 5 configured to measure the distance to the surface of the workpiece W based on the distance measuring light projected and received via the laser light scanning section 4; and the coaxial camera 6 and the wide area camera 7 that capture the surface of the workpiece W.

Here, the laser light guide section 3 according to this embodiment not only forms the optical path but also is combined with a plurality of members such as a Z scanner (focus adjustment section) 33 adjusting a focal position of laser light, a guide light source 36 emitting guide light, the coaxial camera 6 capturing the surface of the workpiece W, and the like.

The laser light guide section 3 further includes: an upstream merging mechanism 31 that causes the near-infrared laser light output from the laser light output section 2 to merge with the guide light emitted from the guide light source 36; and a downstream merging mechanism 35 that causes the laser light guided to the laser light scanning section 4 to merge with the distance measuring light projected from the distance measuring unit 5.

Figure 3A:
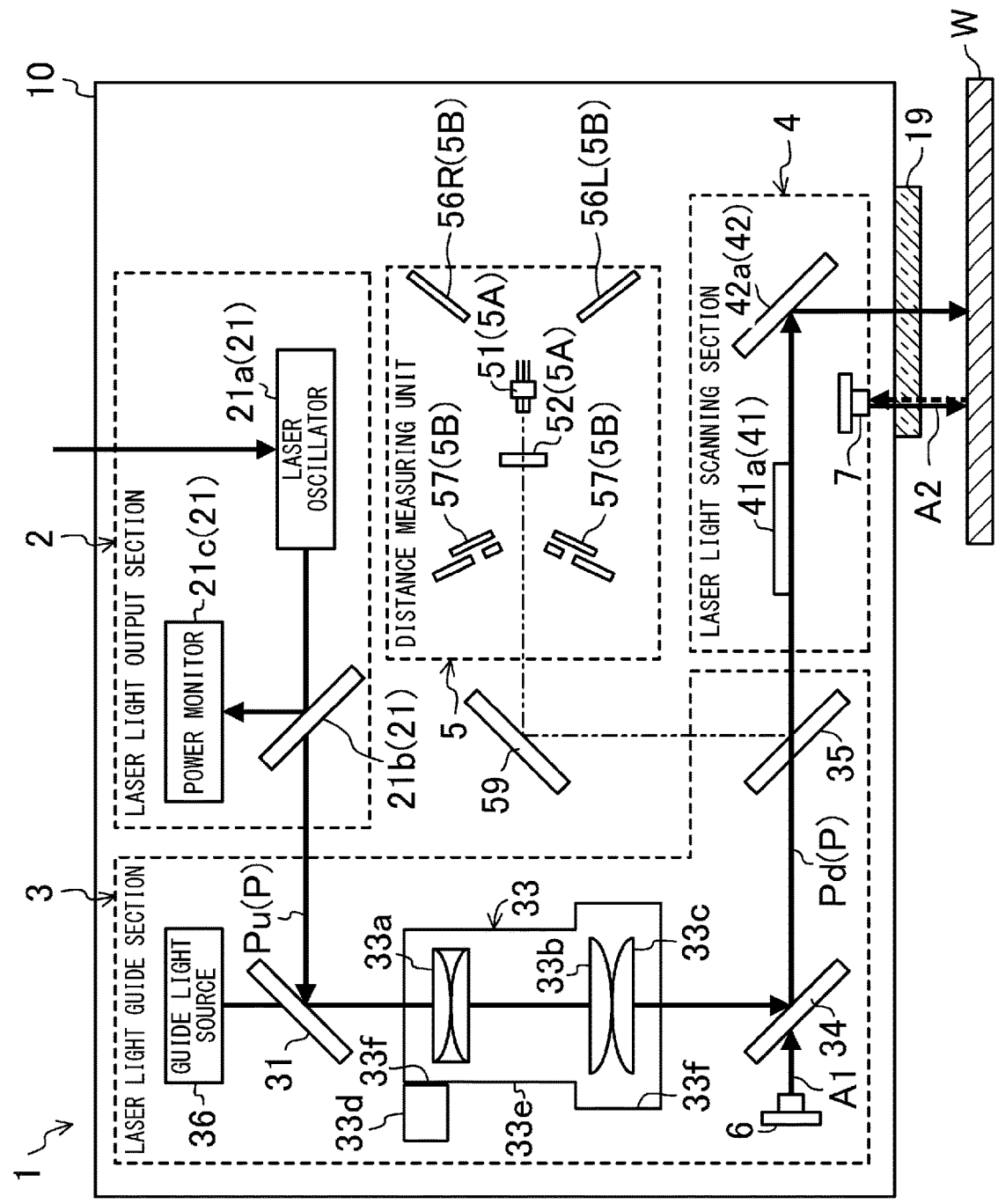
FIG. 3A is a block diagram illustrating a schematic configuration of a marker head.
Figure 3B:
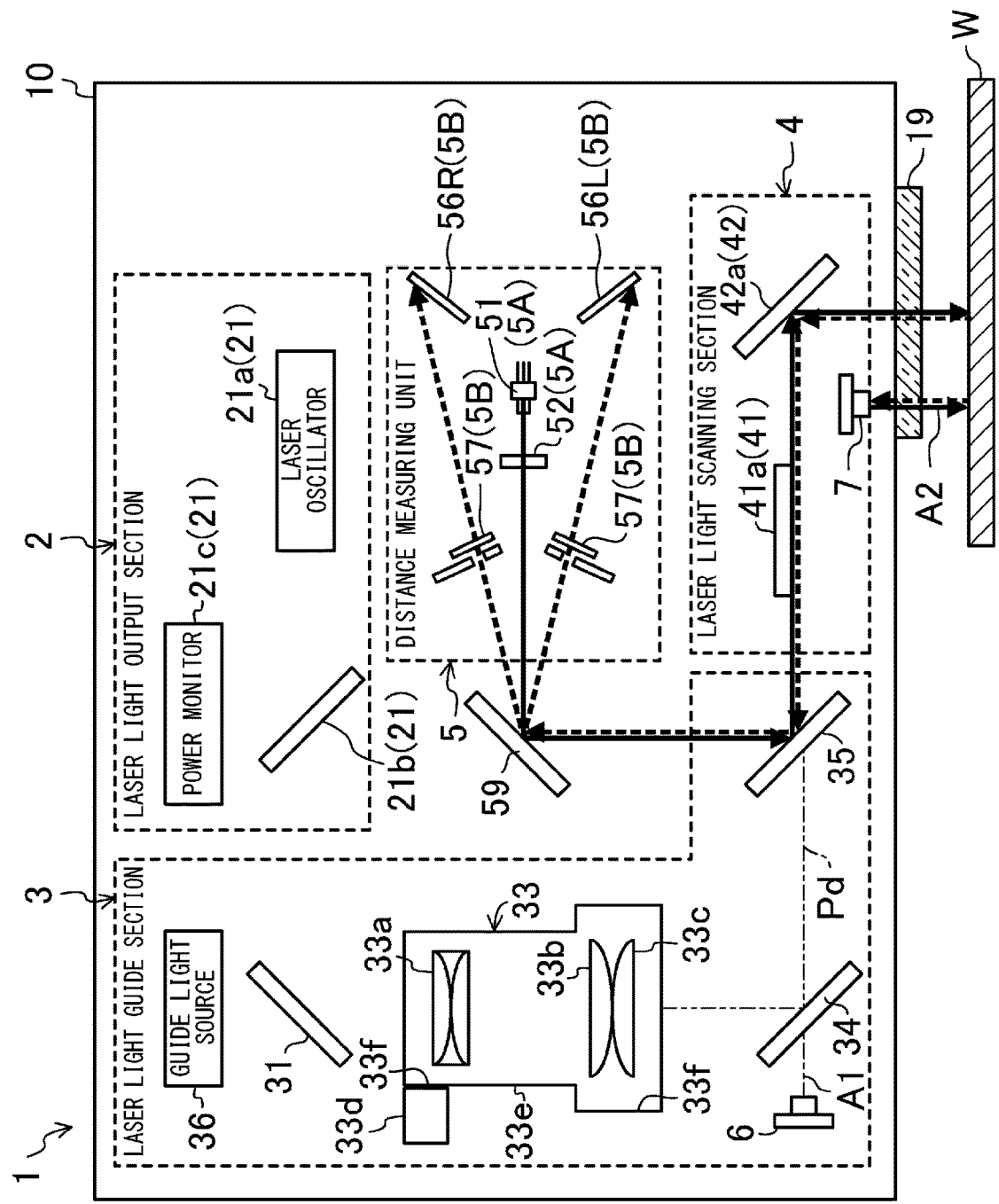
FIG. 3B is a block diagram illustrating the schematic configuration of the marker head.
Figure 4:
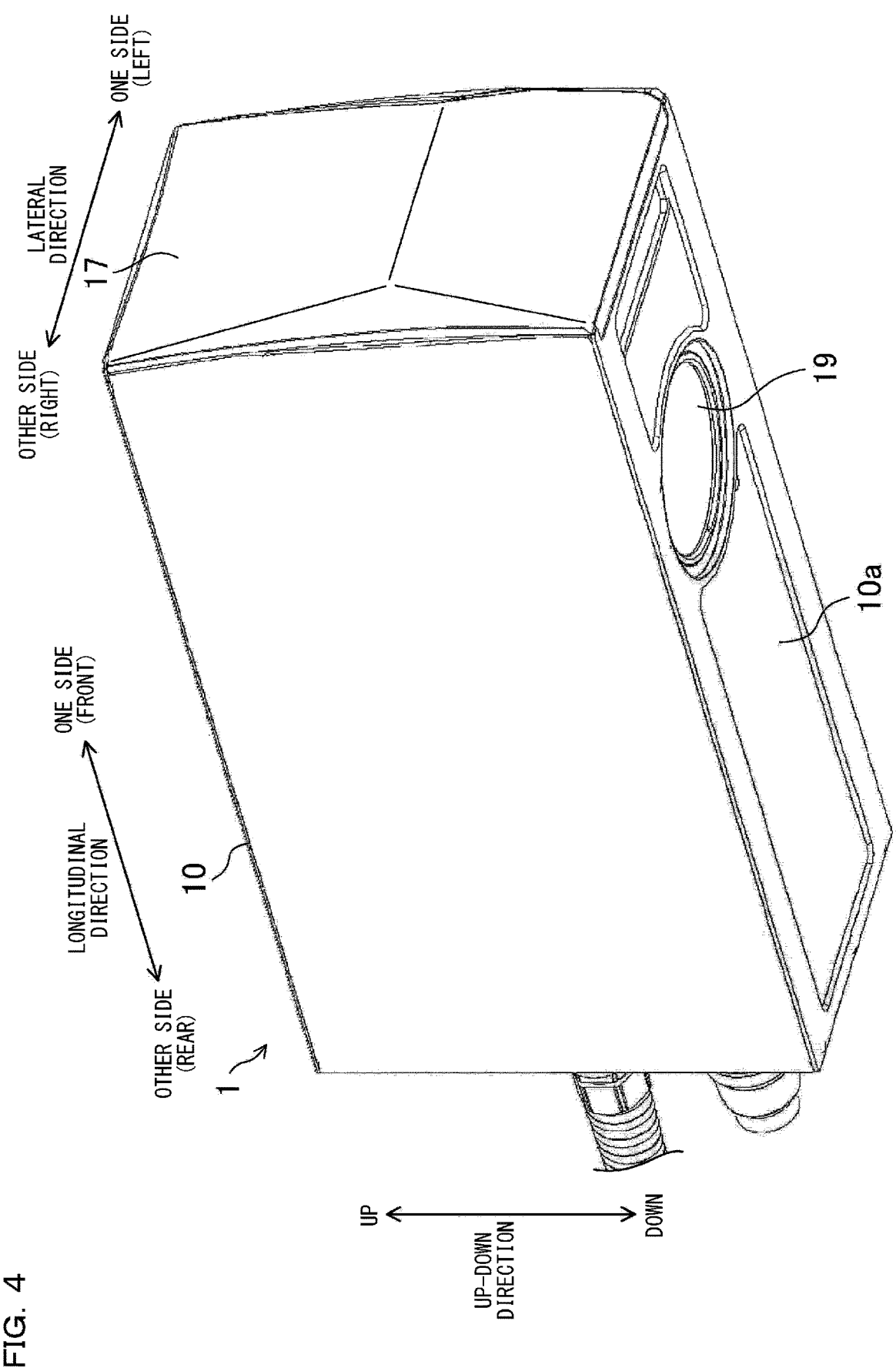
FIG. 4 is a perspective view illustrating an appearance of the marker head.

FIGS. 3A and 3B are block diagrams illustrating the schematic configuration of the marker head 1, and FIG. 4 is a perspective view illustrating an appearance of the marker head 1. Between FIGS. 3A to 3B, FIG. 3A illustrates a case where the workpiece W is processed using near-infrared laser light, and FIG. 3B illustrates a case where the distance measuring unit 5 is used to measure the distance to the surface of the workpiece W.

As illustrated in FIGS. 3A to 4, the marker head 1 includes a housing 10 in which at least the laser light output section 2, the laser light guide section 3, the laser light scanning section 4, and the distance measuring unit 5 are provided. The housing 10 has a substantially rectangular outer shape as illustrated in FIG. 4. A lower surface of the housing 10 is partitioned by a plate-shaped bottom plate 10a. The bottom plate 10a is provided with a light-transmissive window 19 configured to emit laser light from the marker head 1 to the outside of the marker head 1. The light-transmissive window 19 is configured by fitting a plate-shaped transparent member that can transmit near-infrared laser light, guide light, and distance measuring light into a through-hole that penetrates the bottom plate 10a in a plate thickness direction.

In the following description, a longitudinal direction of the housing 10 in FIG. 4 is sometimes simply referred to as the "longitudinal direction" or a "front-rear direction", and a lateral direction of the housing 10 in the drawings is sometimes simply referred to as the "lateral direction" or a "left-right direction". Similarly, a height direction of the housing 10 in FIG. 4 is sometimes simply referred to as the "height direction" or an "up-down direction".

Figure 5:
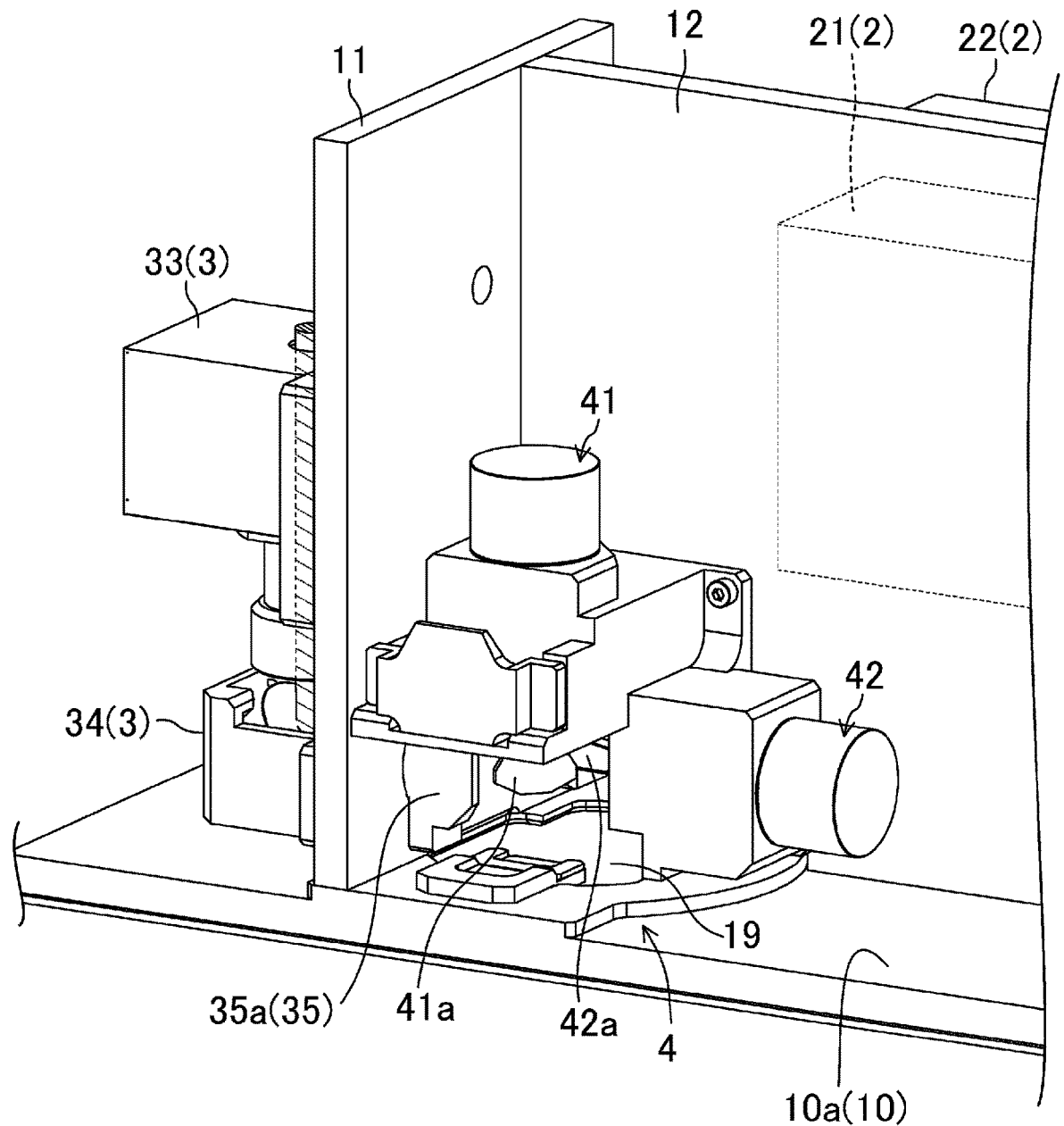
FIG. 5 is a view illustrating a configuration of a laser light scanning section.
Figure 6:
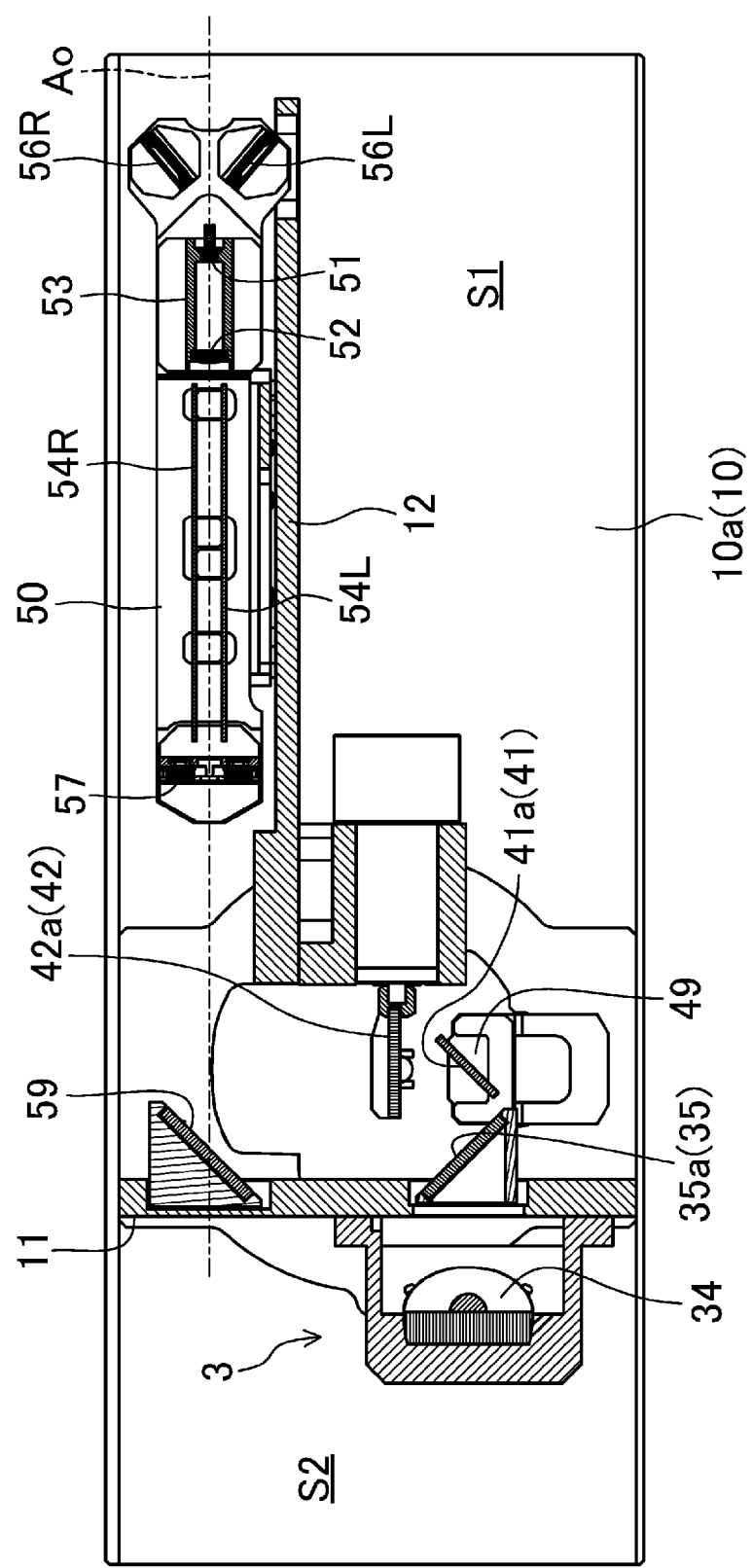
FIG. 6 is a view illustrating a configuration of a laser light guide section, the laser light scanning section, and a distance measuring unit.
Figure 7:
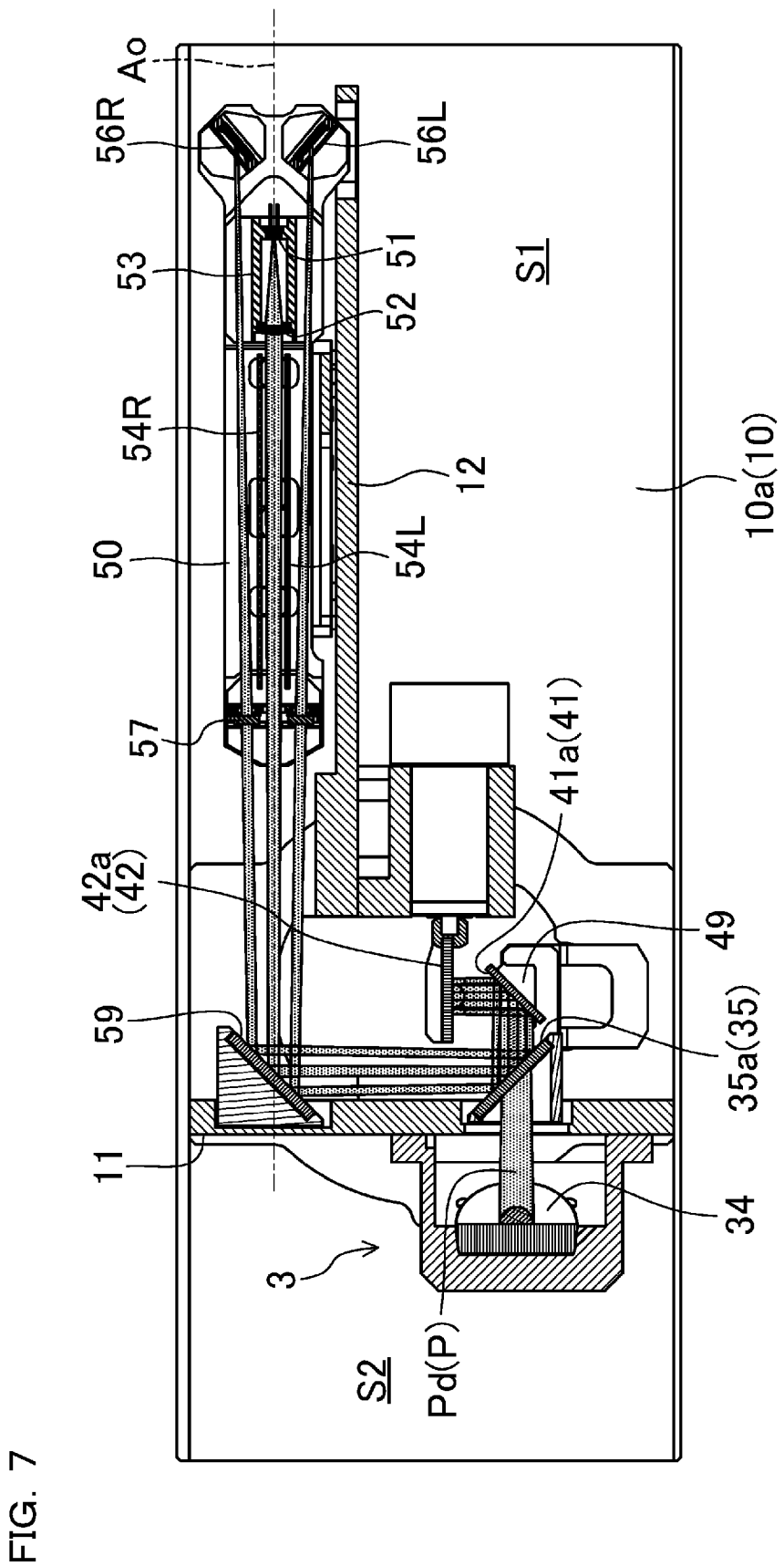
FIG. 7 is a cross-sectional view illustrating an optical path connecting the laser light guide section, the laser light scanning section, and the distance measuring unit.
Figure 8:
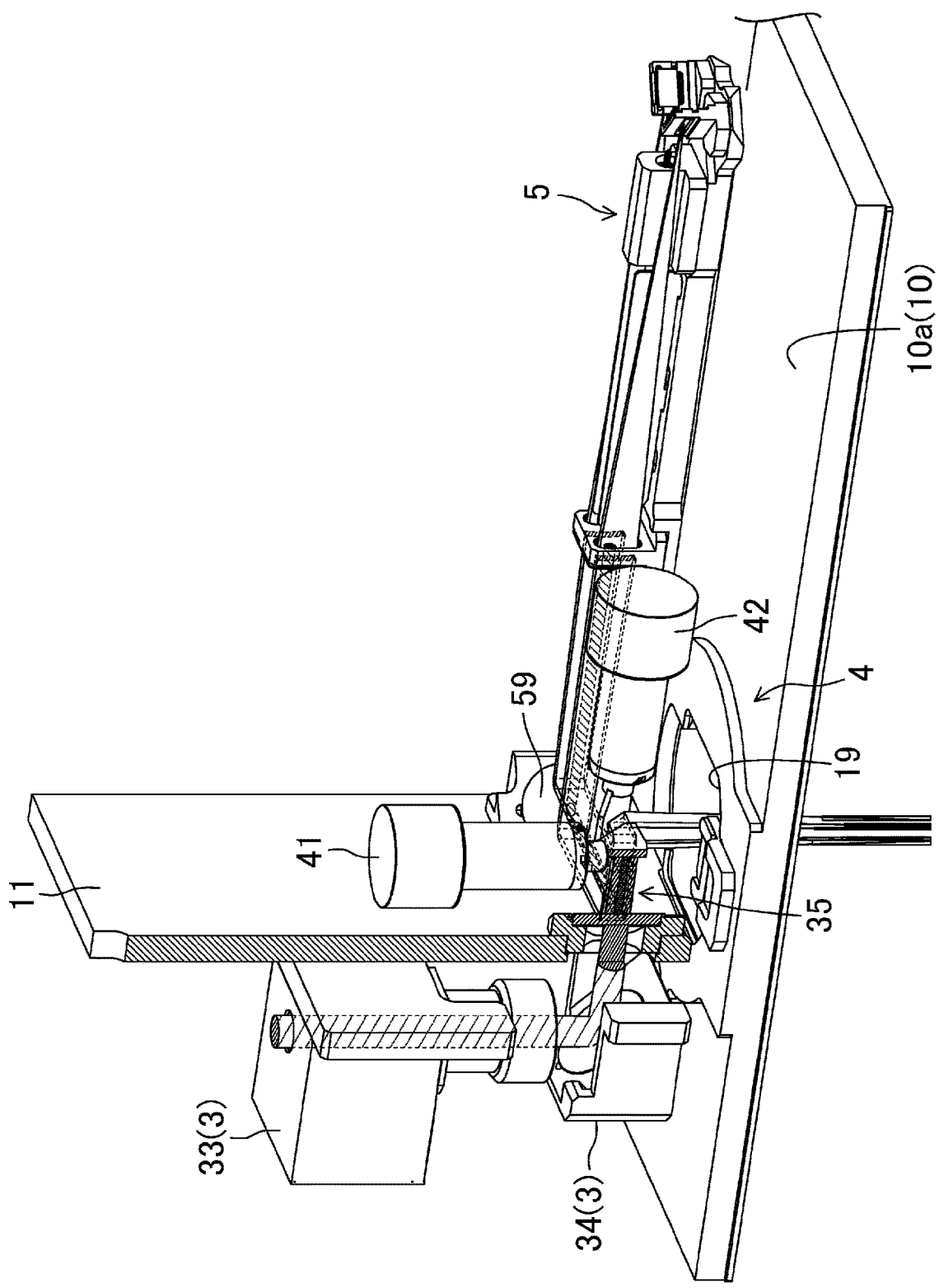
FIG. 8 is a perspective view illustrating the optical path connecting the laser light guide section, the laser light scanning section, and the distance measuring unit.

FIG. 5 is a perspective view illustrating the configuration of the laser light scanning section 4. FIG. 6 is a cross-sectional view illustrating the configurations of the laser light guide section 3, the laser light scanning section 4, and the distance measuring unit 5, FIG. 7 is a cross-sectional view illustrating an optical path connecting the laser light guide section 3, the laser light scanning section 4, and the distance measuring unit 5, and FIG. 8 is a perspective view illustrating an optical path connecting the laser light guide section 3, the laser light scanning section 4, and the distance measuring unit 5.

As illustrated in FIGS. 5 to 6, a partitioning section 11 is provided inside the housing 10. An internal space of the housing 10 is partitioned into one side and the other side in the longitudinal direction by the partitioning section 11.

Specifically, the partitioning section 11 is formed in a flat plate shape extending in a direction perpendicular to the longitudinal direction of the housing 10. In the longitudinal direction of the housing 10, the partitioning section 11 is arranged closer to the one side in the longitudinal direction (front side in FIG. 4) than a central portion of the housing 10 in the same direction.

Accordingly, a space partitioned on the one side in the longitudinal direction in the housing 10 has a shorter dimension in the longitudinal direction than a space partitioned on the other side in the longitudinal direction (rear side in FIG. 4). Hereinafter, the space partitioned on the other side in the longitudinal direction inside the housing 10 is referred to as a first space S1, and the space partitioned on the one side in the longitudinal direction is referred to as a second space S2.

In this embodiment, the laser light output section 2, some components of the laser light guide section 3, the laser light scanning section 4, and the distance measuring unit 5 are arranged inside the first space S1. On the other hand, the main components of the laser light guide section 3 are arranged inside the second space S2.

Specifically, the first space S1 is partitioned by a substantially flat plate-shaped base plate 12 into a space on one side (left side in FIG. 4) and a space on the other side (right side in FIG. 4) in the lateral direction. In the former space, the components constituting the laser light output section 2 are mainly arranged.

More specifically, among the components constituting the laser light output section 2, optical components 21 which are required to be hermetically sealed as much as possible, such as an optical lens and an optical crystal, are arranged inside an accommodation space surrounded by the base plate 12 and the like in the space on the one side in the lateral direction in the first space S1.

On the other hand, among the components constituting the laser light output section 2, components which are not necessarily sealed, such as an electrical wiring, and a heat sink 22 illustrated in FIG. 5, are arranged on the opposite side with the base plate 12 interposed with respect to the optical components 21 (the other side in the lateral direction in the first space S1).

As illustrated in FIGS. 5 and 6, the laser light scanning section 4 can be arranged on the one side in the lateral direction with the base plate 12 interposed similarly to the optical components 21 in the laser light output section 2. Specifically, the laser light scanning section 4 according to this embodiment is adjacent to the partitioning section 11 in the longitudinal direction and arranged along an inner bottom surface of the housing 10 in the up-down direction.

As illustrated in FIG. 6, the distance measuring unit 5 is arranged in the space on the other side in the lateral direction of the first space S1 similarly to the heat sink 22 in the laser light output section 2.

Further, the components constituting the laser light guide section 3 are mainly arranged in the second space S2. In this embodiment, most of the components constituting the laser light guide section 3 are accommodated in a space surrounded by the partitioning section 11 and a cover member 17 that defines a front surface of the housing 10.

Among the components constituting the laser light guide section 3, the downstream merging mechanism 35 is arranged at a site near the partitioning section 11 in the first space S1 (see FIG. 5). That is, the downstream merging mechanism 35 is located near a boundary between the first space S1 and the second space S2 in this embodiment.

A through-hole (not illustrated) which penetrates the base plate 12 in the plate thickness direction is formed in the base plate 12. Through this through-hole, the laser light guide section 3 and the laser light scanning section 4 are optically coupled to the distance measuring unit 5.

Hereinafter, the configurations of the laser light output section 2, the laser light guide section 3, the laser light scanning section 4, and the distance measuring unit 5 will be described in order.

(Laser Light Output Section 2)

The laser light output section 2 is configured to generate near-infrared laser light for printing based on the laser excitation light generated by the excitation light generation section 110 and to output the near-infrared laser light for printing to the laser light guide section 3.

Specifically, the laser light output section 2 includes: a laser oscillator 21a which generates laser light having a predetermined wavelength based on laser excitation light and amplifies the laser light and emits near-infrared laser light; a beam sampler 21b configured to separate a part of the near-infrared laser light oscillated from the laser oscillator 21a; and a power monitor 21c to which the near-infrared laser light separated by the beam sampler 21b is incident.

Although details are omitted, the laser oscillator 21a according to this embodiment includes a laser medium that performs stimulated emission corresponding to laser excitation light to emit laser light, a Q switch configured to pulse the laser light emitted from the laser medium, and a mirror that resonates the laser light pulsed by the Q switch.

Particularly in this embodiment, rod-shaped $Nd:YVO_4$ (yttrium vanadate) is used as the laser medium. As a result, the laser oscillator 21a can emit laser light having a wavelength near 1064 nm (the above-described near-infrared laser light) as the laser light. However, rare earth-doped YAG, YLF, $GdVO_4$, and the like, for example, can be used as other laser media without being limited to this example. Various solid-state laser media can be used in accordance with an application of the laser processing apparatus L.

It is also possible to combine a solid-state laser medium with a wavelength conversion element to convert a wavelength of output laser light into an arbitrary wavelength. Further, a so-called fiber laser in which a fiber is used as an oscillator, instead of a bulk, may be used as a solid-state laser medium.

Furthermore, the laser oscillator 21a may be configured by combining a solid-state laser medium such as $Nd:YVO_4$ and a fiber. In such a case, it is possible to suppress thermal damage to the workpiece W by emitting a laser having a short pulse width as in the case of using a solid-state laser medium, and further to realize high output and faster printing as in the case of using a fiber.

The power monitor 21c detects the output of near-infrared laser light. The power monitor 21c is electrically connected to the marker controller 100 and can output a detection signal thereof to the control section 101 and the like.

(Laser Light Guide Section 3)

The laser light guide section 3 forms at least a part of a laser light path P that guides the near-infrared laser light emitted from the laser light output section 2 to the laser light scanning section 4. The laser light guide section 3 includes the Z scanner (focus adjustment section) 33, the guide light source (guide light emission section) 36, and the like, in addition to a bend mirror 34 configured to form the laser light path P. All of these components are provided inside the housing 10 (mainly in the second space S2).

The near-infrared laser light incident from the laser light output section 2 is reflected by the bend mirror 34 and passes through the laser light guide section 3. The Z scanner 33 configured to adjust a focal position of the near-infrared laser light is arranged on the way to the bend mirror 34. The near-infrared laser light, which has passed through the Z scanner 33 and been reflected by the bend mirror 34, is incident to the laser light scanning section 4.

The laser light path P formed by the laser light guide section 3 can be divided into two parts with the Z scanner 33, which is the focus adjustment section, as a boundary. Specifically, the laser light path P formed by the laser light guide section 3 can be divided into an upstream optical path Pu from the laser light output section 2 to the Z scanner 33 and a downstream optical path Pd from the Z scanner 33 to the laser light scanning section 4.

More specifically, the upstream optical path Pu is provided inside the housing 10, and extends from the laser light output section 2 to the Z scanner 33 after passing through the upstream merging mechanism 31.

On the other hand, the downstream optical path Pd is provided inside the housing 10, and extends from the Z scanner 33 to a first scanner 41 in the laser light scanning section 4 after sequentially passing through the bend mirror 34 and the downstream merging mechanism 35.

In this manner, inside the housing 10, the upstream merging mechanism 31 is provided in the middle of the upstream optical path Pu, and the downstream merging mechanism 35 is provided in the middle of the downstream optical path Pd.

Hereinafter, the configurations related to the laser light guide section 3 will be sequentially described.

—Guide Light Source 36—

The guide light source 36 is provided in the second space S2 inside the housing 10, and emits guide light configured to project a predetermined processing pattern onto the surface of the workpiece W. A wavelength of the guide light is set to fall within a visible light range. As an example thereof, the guide light source 36 according to this embodiment emits red laser light having a wavelength near 655 nm as the guide light. Accordingly, when the guide light is emitted from the marker head 1, a user can visually recognize the guide light.

In this embodiment, the wavelength of the guide light is set to be different from at least a wavelength of near-infrared laser light. As will be described later, a distance measuring light emitting section 5A of the distance measuring unit 5 emits distance measuring light having a wavelength different from those of the guide light and the near-infrared laser light. Accordingly, the distance measuring light, the guide light, and the laser light have wavelengths different from each other.

Specifically, the guide light source 36 is arranged at substantially the same height as the upstream merging mechanism 31 in the second space S2, and can emit a visible light laser (guide light) toward the inner side of the housing 10 in the lateral direction. The guide light source 36 is also arranged such that an optical axis of the guide light emitted from the guide light source 36 intersects the upstream merging mechanism 31.

Note that the "substantially the same height" here indicates that height positions are substantially the same as viewed from the bottom plate 10*a* forming the lower surface of the housing 10. This height indicates the height as viewed from the bottom plate 10*a* in the other description.

For example, when guide light is emitted from the guide light source 36 such that a user can visually recognize a processing pattern of near-infrared laser light, the guide light reaches the upstream merging mechanism 31. The upstream merging mechanism 31 has a dichroic mirror (not illustrated) as an optical component. This dichroic mirror reflects the near-infrared laser light while the transmitting guide light as will be described later. As a result, the guide light that has passed through the dichroic mirror and the near-infrared laser light that has been reflected by the same mirror merge with each other to become coaxial.

Note that the guide light source 36 according to this embodiment is configured to emit the guide light based on the control signal output from the control section 101.

—Upstream Merging Mechanism 31—

The upstream merging mechanism 31 causes the guide light emitted from the guide light source 36, which is the guide light emission section, to merge with the upstream optical path Pu. Since the upstream merging mechanism 31 is provided, the guide light emitted from the guide light source 36 and the near-infrared laser light on the upstream optical path Pu can be made coaxial.

As described above, the wavelength of the guide light is set to be different from at least the wavelength of the near-infrared laser light. Therefore, the upstream merging mechanism 31 can be configured using, for example, the dichroic mirror as described above. The near-infrared laser light and the guide light, which have been made coaxial by the dichroic mirror, propagate downward, pass through the Z scanner 33, and reach the bend mirror 34.

—Z Scanner 33—

The Z scanner 33, which is the focus adjustment section, is arranged in the middle of the optical path formed by the laser light guide section 3, and can adjust the focal position of the near-infrared laser light emitted from the laser light output section 2.

Specifically, the Z scanner 33 is provided in the middle of an optical path from the upstream merging mechanism 31, which is a guide light merging mechanism, to the laser light scanning section 4 in the laser light path P inside the housing 10.

Specifically, the Z scanner 33 according to this embodiment includes: an input lens 33*a* that transmits the near-infrared laser light emitted from the laser light output section 2; a collimator lens 33*b* that transmits the near-infrared laser light having passed through the input lens 33*a*; an output lens 33*c* that transmits the near-infrared laser light having passed through the input lens 33*a* and the collimator lens 33*b*; a lens drive section 33*d* that moves the input lens 33*a*; and a casing 33*e* that accommodates the input lens 33*a*, the collimator lens 33*b*, and the output lens 33*c*, as illustrated in FIGS. 3A to 3B.

The input lens 33*a* is a plano-concave lens, and the collimator lens 33*b* and the output lens 33*c* are plano-convex lenses. The input lens 33*a*, the collimator lens 33*b*, and the output lens 33*c* are arranged such that optical axes thereof are coaxial with each other.

In the Z scanner 33, the lens drive section 33*d* moves the input lens 33*a* along the optical axis. As a result, it is possible to change a relative distance between the input lens 33*a* and the output lens 33*c* while keeping the respective optical axes of the input lens 33*a*, the collimator lens 33*b*, and the output lens 33*c* coaxial with respect to the near-infrared laser light passing through the Z scanner 33. As a result, the focal position of the near-infrared laser light with which the workpiece W is irradiated changes.

Hereinafter, the respective sections of the Z scanner 33 will be described in more detail.

The casing 33*e* has a substantially cylindrical shape. As illustrated in FIGS. 3A and 3B, openings 33*f* configured to pass near-infrared laser light are formed at both ends of the casing 33*e*. Inside the casing 33*e*, the input lens 33*a*, the collimator lens 33*b*, and the output lens 33*c* are arrayed in this order in the up-down direction.

Among the input lens 33*a*, the collimator lens 33*b*, and the output lens 33*c*, the collimator lens 33*b* and the output lens 33*c* are fixed inside the casing 33*e*. On the other hand, the input lens 33*a* is provided so as to be movable in the up-down direction. The lens drive section 33*d* has, for example, a motor and moves the input lens 33*a* in the up-down direction. As a result, the relative distance between the input lens 33*a* and the output lens 33*c* is changed.

For example, it is assumed that the distance between the input lens 33*a* and the output lens 33*c* is adjusted to be relatively short by the lens drive section 33*d*. In this case, a collection angle of near-infrared laser light passing through the output lens 33*c* is relatively small, and thus, a focal position of the near-infrared laser light is moved away from the light-transmissive window 19 of the marker head 1.

On the other hand, it is assumed that the distance between the input lens 33*a* and the output lens 33*c* is adjusted to be relatively long by the lens drive section 33*d*. In this case, a collection angle of near-infrared laser light passing through the output lens 33*c* is relatively large, and thus, a focal position of the near-infrared laser light comes close to the light-transmissive window 19 of the marker head 1.

Note that the input lens 33*a* may be fixed inside the casing 33*e* and the collimator lens 33*b* and the output lens 33*c* may be movable in the up-down direction among the input lens 33*a*, the collimator lens 33*b*, and the output lens 33*c* in the Z scanner 33. Alternatively, all of the input lens 33*a*, the collimator lens 33*b*, and the output lens 33*c* may be movable in the up-down direction.

In this manner, the Z scanner 33, which is the focus adjustment section, functions as a mechanism configured to scan the near-infrared laser light in the up-down direction. Hereinafter, a scanning direction of the Z scanner 33 is sometimes referred to as a "Z direction".

The near-infrared laser light passing through the Z scanner 33 is coaxial with the guide light emitted from the guide light source 36 as described above. Therefore, not only the near-infrared laser light but also the focal position of the guide light can be adjusted together by operating the Z scanner 33.

Note that the Z scanner 33 according to this embodiment, particularly the lens drive section 33*d* in the Z scanner 33, is configured to operate based on the control signal output from the control section 101.

—Bend Mirror 34—

The bend mirror 34 is provided in the middle of the downstream optical path Pd, and is arranged so as to bend the optical path Pd to be directed toward the rear side. As illustrated in FIG. 6, the bend mirror 34 is arranged at substantially the same height as an optical member 35a in the downstream merging mechanism 35, and can reflect near-infrared laser light and guide light that have passed through the Z scanner 33.

The near-infrared laser light and guide light reflected by the bend mirror 34 propagate rearward, pass through the downstream merging mechanism 35, and reach the laser light scanning section 4 (specifically, the first scanner 41).

—Downstream Merging Mechanism 35—

The downstream merging mechanism 35 causes the distance measuring light emitted from the distance measuring light emitting section 5A in the distance measuring unit 5 to merge with the downstream optical path Pd to be guided toward the workpiece W via the laser light scanning section 4. In addition, the downstream merging mechanism 35 guides the distance measuring light, which has been reflected by the workpiece W and returned sequentially to the laser light scanning section 4 and the downstream optical path Pd, to the distance measuring light receiving section 5B in the distance measuring unit 5.

Since the downstream merging mechanism 35 is provided, the distance measuring light emitted from the distance measuring light emitting section 5A and the near-infrared laser light and the guide light in the downstream optical path Pd can be made coaxial. At the same time, the distance measuring light incident on the marker head 1 out of the distance measuring light having been emitted from the marker head 1 and reflected by the workpiece W can be guided to the distance measuring light receiving section 5B since the downstream merging mechanism 35 is provided.

As described above, the wavelength of the distance measuring light is set to be different from the wavelengths of the near-infrared laser light and the guide light. Therefore, the downstream merging mechanism 35 can be configured by using, for example, a dichroic mirror, similarly to the upstream merging mechanism 31.

Specifically, the downstream merging mechanism 35 according to this embodiment has a dichroic mirror 35a that transmits one of the distance measuring light and the guide light and reflects the other (see FIGS. 6 and 7). More specifically, the dichroic mirror 35a is arranged at approximately the same height as the bend mirror 34 on the rear side of the bend mirror 34, and is arranged in the space on the left side in the lateral direction in the housing 10.

As illustrated in FIG. 6 and the like, the dichroic mirror 35a is also fixed in a posture in which a mirror surface on one side faces the bend mirror 34 and a mirror surface on the other side faces the base plate 12. Accordingly, the near-infrared laser light and the guide light are incident on the mirror surface on the one side of the dichroic mirror 35a, and the distance measuring light is incident on the mirror surface on the other side.

The dichroic mirror 35a according to this embodiment can reflect the distance measuring light and transmit the near-infrared laser light and the guide light. As a result, for example, when the distance measuring light emitted from the distance measuring unit 5 is incident on the dichroic mirror 35a, the distance measuring light can be caused to merge with the downstream optical path Pd to be coaxial with the near-infrared laser light and the guide light. The near-infrared laser light, the guide light, and the distance measuring light made coaxial in this manner reach the first scanner 41 as illustrated in FIGS. 3A and 3B.

Meanwhile, the distance measuring light that has been reflected by the workpiece W returns to the laser light scanning section 4 and reaches the downstream optical path Pd. The distance measuring light that has returned to the downstream optical path P is reflected by the dichroic mirror 35a in the downstream merging mechanism 35 and reaches the distance measuring unit 5.

Note that both the distance measuring light incident on the dichroic mirror 35a from the distance measuring unit 5 and the distance measuring light reflected by the dichroic mirror 35a and incident on the distance measuring unit 5 propagate along the left-right direction (the lateral direction of the housing 10) when the housing 10 is viewed in a plan view as illustrated in FIG. 7.

(Laser Light Scanning Section 4)

As illustrated in FIG. 3A, the laser light scanning section 4 is configured to irradiate the workpiece W with laser light (near-infrared laser light) emitted from the laser light output section 2 and guided by the laser light guide section 3, and to perform two-dimensional scanning on the surface of the workpiece W.

In the example illustrated in FIG. 5, the laser light scanning section 4 is configured as a so-called biaxial galvano scanner. That is, the laser light scanning section 4 includes: the first scanner 41 configured to scan the near-infrared laser light incident from the laser light guide section 3 in a first direction; and a second scanner 42 configured to scan the near-infrared laser light scanned by the first scanner 41 in a second direction.

Here, the second direction indicates a direction substantially orthogonal to the first direction. Accordingly, the second scanner 42 can scan the near-infrared laser light in the direction substantially orthogonal to the first scanner 41. In this embodiment, the first direction is equal to the front-rear direction (the longitudinal direction of the housing 10) and the second direction is equal to the left-right direction (the lateral direction of the housing 10). Hereinafter, the first direction is referred to as an "X direction", and the second direction orthogonal thereto is referred to as a "Y direction". Both the X direction and the Y direction are orthogonal to the above-described Z direction.

The first scanner 41 has a first mirror 41a at a distal end thereof. The first mirror 41a is arranged at substantially the same height as the bend mirror 34 and the optical member 35a on the rear side of the optical member 35a. As illustrated in FIG. 5, the bend mirror 34, the optical member 35a, and the first mirror 41a are arrayed in a line along the front-rear direction (the longitudinal direction of the housing 10).

Further, the first mirror 41a is rotationally driven by a motor (not illustrated) built in the first scanner 41. This motor can rotate the first mirror 41a about a rotation axis extending in the up-down direction. A reflection angle of near-infrared laser light by the first mirror 41a can be adjusted by adjusting a rotation posture of the first mirror 41a.

Similarly, the second scanner 42 has a second mirror 42a at a distal end thereof. The second mirror 42a is arranged at substantially the same height as the first mirror 41a in the first scanner 41 on the right side of the first mirror 41a. As illustrated in FIG. 6, the first mirror 41a and the second mirror 42a are arrayed along the left-right direction (the lateral direction of the housing 10).

Further, the second mirror 42a is rotationally driven by a motor (not illustrated) built in the second scanner 42. This motor can rotate the second mirror 42a about a rotation axis extending in the front-rear direction. A reflection angle of near-infrared laser light by the second mirror 42a can be adjusted by adjusting a rotation posture of the second mirror 42a.

When near-infrared laser light is incident on the laser light scanning section 4 from the downstream merging mechanism 35, the near-infrared laser light is sequentially reflected by the first mirror 41a in the first scanner 41 and the second mirror 42a in the second scanner 42, and is emitted to the outside of the marker head 1 via the light-transmissive window 19.

At that time, it is possible to scan the near-infrared laser light in the first direction on the surface of the workpiece W by operating the motor of the first scanner 41 to adjust the rotation posture of the first mirror 41a. At the same time, it is possible to scan the near-infrared laser light in the second direction on the surface of the workpiece W by operating the motor of the second scanner 42 to adjust the rotation posture of the second mirror 42a.

As described above, not only the near-infrared laser light but also the guide light that has passed through the optical member 35a of the downstream merging mechanism 35 or the distance measuring light reflected by the same member 35a is also incident to the laser light scanning section 4. The laser light scanning section 4 according to this embodiment can two-dimensionally scan the guide light or the distance measuring light incident in this manner by operating the first scanner 41 and the second scanner 42, respectively.

The rotation postures that the first mirror 41a and the second mirror 42a can take are basically set within a range that allows reflected light to pass through the light-transmissive window 19 when the near-infrared laser light is reflected by the second mirror 42a (see also FIGS. 7 to 8).

In this manner, the laser light scanning section 4 according to this embodiment is electrically controlled by the control section 101, which is the scanning control section, and can irradiate a processing area R1 set on the surface of the workpiece W with near-infrared laser light to form a predetermined processing pattern (marking pattern) in the processing area R1.

(Coaxial Camera 6)

The coaxial camera 6 has an imaging optical axis A1 branching from the laser light path P from the laser light output section 2 to the laser light scanning section 4 (see FIGS. 3A and 3B). The coaxial camera 6 can capture an image of the workpiece W with the laser light scanning section 4 to generate a captured image Pw including at least a part of the processing area R1. The coaxial camera 6 is an example of a "first imaging section" in this embodiment.

The coaxial camera 6 is configured as an imaging mechanism that is coaxial with near-infrared laser light for processing. The coaxial camera 6 has a narrower field of view than the wide area camera 7, but can generate a coaxial image in which the processing area R1 is enlarged at a relatively high magnification as the captured image Pw and can two-dimensionally scan an imaging area with the laser light scanning section 4. The coaxial camera 6 is used, for example, to locally enlarge and capture a part of the processing area R1.

The captured image Pw generated by the coaxial camera 6 can be displayed on the display section 801 in a state where at least a part thereof is enlarged or reduced.

The coaxial camera 6 according to this embodiment is built in the housing 10. Specifically, the coaxial camera 6 is arranged at substantially the same height as the bend mirror 34 in the laser light guide section 3. The coaxial camera 6 receives the reflected light incident to the laser light guide section 3 from the laser light scanning section 4. The coaxial camera 6 is configured such that the reflected light reflected at a printing point of the workpiece W enters via the bend mirror 34. The coaxial camera 6 can form an image of the reflected light thus entered to capture the surface of the workpiece W. Note that the layout of the coaxial camera 6 can be changed as appropriate. For example, the heights of the coaxial camera 6 and the bend mirror 34 may be different from each other.

The reflected light used for image formation by the coaxial camera 6 branches off from the downstream optical path Pd and propagates. Accordingly, the processing area R1 illustrated in FIG. 12 can be two-dimensionally scanned by appropriately operating the laser light scanning section 4.

The coaxial camera 6 according to this embodiment is configured to operate based on the control signal output from the control section 101 similarly to the guide light source 36 or the like.

(Wide Area Camera 7)

Figure 12:
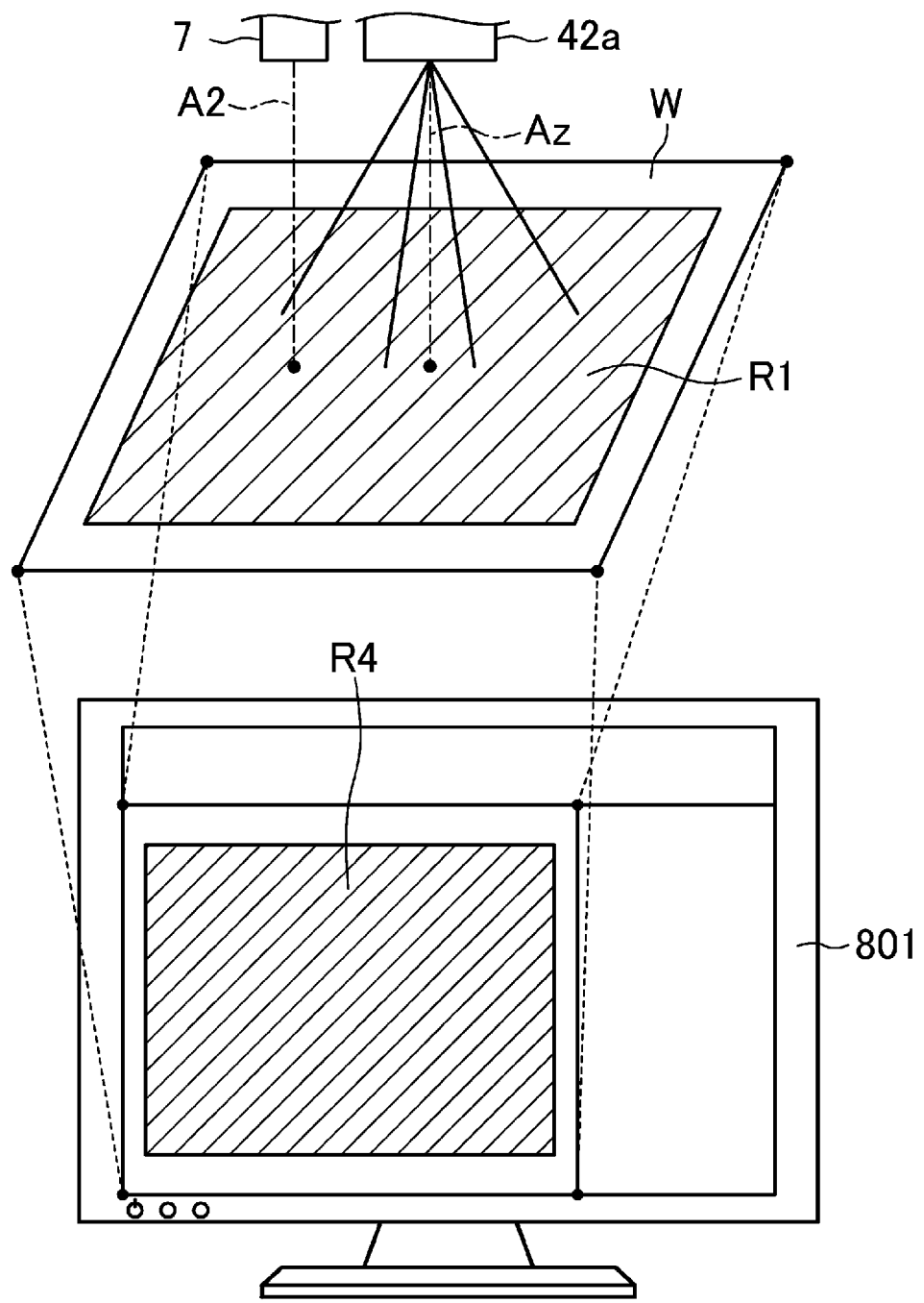
FIG. 12 is a view illustrating a relationship between a processing area and a setting plane.

The wide area camera 7 has an imaging optical axis A2 branching from the laser light path P (see FIG. 12). The wide area camera 7 can capture the workpiece W without the laser light scanning section 4 to generate a captured image Pw having a wider field of view than the image generated by the coaxial camera 6. The wide area camera 7 is an example of a "second imaging section" in this embodiment.

The wide area camera 7 is configured as an imaging mechanism that is not coaxial with near-infrared laser light for processing. The wide area camera 7 is not capable of performing two-dimensional scanning using the laser light scanning section 4, but has the wider field of view than the coaxial camera 6, and can generate a wide-area image obtained by capturing the processing area R1 in a relatively wide field of view as the captured image Pw. The wide area camera 7 is used, for example, to capture the entire processing area R1 at once.

The captured image Pw generated by the wide area camera 7 can be displayed on the display section 801 in a state where at least a part thereof is enlarged or reduced. The display section 801 can display the captured image Pw generated by the wide area camera 7 and the captured image Pw generated by the coaxial camera 6 side by side or selectively display one of the two types of captured image Pw.

The wide area camera 7 according to this embodiment is arranged immediately above the light-transmissive window 19 and is fixed in a posture in which an imaging lens thereof faces downward. As described above, the imaging optical axis A2 of the wide area camera 7 is not coaxial with an optical axis Az of the above-described near-infrared laser light (see FIGS. 3A, 3B, and 12).

Note that the "imaging section" according to this embodiment includes at least one of the coaxial camera 6 as the first imaging section and the wide area camera 7 as the second imaging section. That is, the captured image Pw generated by the coaxial camera 6 or the wide area camera 7 is used in a control aspect to be described later, and this captured image Pw may be described using any one of the coaxial camera 6 or the wide area camera 7, or described using the both in combination. The configuration including both the coaxial camera 6 and the wide area camera 7 is not essential.

(Distance Measuring Unit 5)

As illustrated in FIG. 3B, the distance measuring unit 5 projects distance measuring light via the laser light scanning section 4 and irradiates the surface of the workpiece W with the distance measuring light. The distance measuring unit 5 also receives the distance measuring light reflected by the surface of the workpiece W via the laser light scanning section 4.

The distance measuring unit 5 is mainly divided into a module for projection of distance measuring light and a module for reception of distance measuring light. Specifically, the distance measuring unit 5 includes: the distance measuring light emitting section 5A configured as the module for projection of distance measuring light; and the distance measuring light receiving section 5B configured as the module for reception of distance measuring light.

The distance measuring light emitting section 5A is provided inside the housing 10, and emits distance measuring light for measurement of the distance from the marker head 1 to the surface of the workpiece W in the laser processing apparatus L toward the laser light scanning section 4.

On the other hand, the distance measuring light receiving section 5B is provided inside the housing 10 similarly to the distance measuring light emitting section 5A, and receives distance measuring light which has been reflected on the surface of the workpiece W and has returned via the laser light scanning section 4 and the downstream merging mechanism 35.

Further, the distance measuring unit 5 includes a support base 50 that supports the distance measuring light emitting section 5A and the distance measuring light receiving section 5B from below, and is fixed to the inside of the housing 10 via the support base 50.

As described above, the distance measuring unit 5 is provided in the space on the other side in the lateral direction of the first space S1. As illustrated in FIG. 7, the distance measuring unit 5 emits distance measuring light forward along the longitudinal direction of the housing 10 and receives distance measuring light propagating substantially rearward along the longitudinal direction.

The distance measuring unit 5 is optically coupled to the laser light guide section 3 via the above-described optical member 35a. As described above, the distance measuring unit 5 projects the distance measuring light along the longitudinal direction of the housing 10. On the other hand, the optical member 35a is configured to reflect the distance measuring light which has propagated along not the longitudinal direction of the housing 10 but the lateral direction thereof.

Therefore, a bend mirror 59 is provided inside the housing 10 so as to form an optical path connecting the distance measuring unit 5 and the optical member 35a (see FIGS. 6 and 7).

Accordingly, the distance measuring light that has been incident to the bend mirror 59 from the distance measuring light emitting section 5A is incident to the optical member 35a reflected by the same mirror 59. On the other hand, the distance measuring light that has returned to the laser light scanning section 4 and has been reflected by the optical member 35a is incident to the bend mirror 59 and is reflected by the same mirror 59 to be incident to the distance measuring light receiving section 5B.

Hereinafter, the configurations of the respective sections of the distance measuring unit 5 will be described in order.

—Distance Measuring Light Emitting Section 5A—

The distance measuring light emitting section 5A is provided inside the housing 10, and is configured to emit the distance measuring light for measurement of the distance from the marker head 1 to the surface of the workpiece W in the laser processing apparatus L.

Specifically, the distance measuring light emitting section 5A includes: a distance measuring light source 51 and a light projecting lens 52, a casing 53 that accommodates these, and a pair of guide plates 54L and 54R that guide distance measuring light collected by the light projecting lens 52. The distance measuring light source 51, the light projecting lens 52, and the guide plates 54L and 54R are arranged in order from the rear side of the housing 10, and an array direction thereof is substantially the same as the longitudinal direction of the housing 10.

The casing 53 is formed in a tubular shape extending along the longitudinal direction of the housing 10 and the support base 50, the distance measuring light source 51 is attached to one side in the same direction, that is, one end corresponding to the rear side of the housing 10, and the light projecting lens 52 is attached to the other end corresponding to the front side of the housing 10. A space between the distance measuring light source 51 and the light projecting lens 52 is sealed in a substantially airtight manner.

The distance measuring light source 51 emits distance measuring light toward the front side of the housing 10 in accordance with the control signal input from the control section 101. Specifically, the distance measuring light source 51 can emit laser light in a visible light range as the distance measuring light. In particular, the distance measuring light source 51 according to this embodiment emits red laser light having a wavelength near 690 nm as the distance measuring light.

Further, the distance measuring light source 51 is fixed in a posture in which an optical axis Ao of the red laser light emitted as the distance measuring light extends along the longitudinal direction of the casing 53. Accordingly, the optical axis Ao of the distance measuring light extends along the longitudinal direction of the housing 10 and the support base 50, passes through a central portion of the light projecting lens 52, and reaches the outside of the casing 53.

The light projecting lens 52 is located between a light receiving lens 57 and a pair of light receiving elements 56L and 56R in the distance measuring light receiving section 5B in the longitudinal direction of the support base 50. The light projecting lens 52 is provided in a posture allowing passage of the optical axis Ao of the distance measuring light.

The light projecting lens 52 can be, for example, a plano-convex lens, and a spherical convex surface can be fixed in a posture facing the outside of the casing 53. The light projecting lens 52 collects the distance measuring light emitted from the distance measuring light source 51 and emits the distance measuring light to the outside of the casing 53. The distance measuring light emitted to the outside of the casing 53 reaches between the guide plates 54L and 54R.

The guide plates 54L and 54R are configured as a pair of members arrayed in the lateral direction of the support base 50, and each can be a plate-like member extending in the longitudinal direction of the support base 50. A space configured to emit distance measuring light is defined between the one guide plate 54L and the other guide plate 54R. The distance measuring light emitted to the outside of the casing 53 passes through the space thus partitioned and is output.

Accordingly, the distance measuring light emitted from the distance measuring light source 51 passes through the space inside the casing 53, a central portion of the light projecting lens 52, and the space between the guide plates 54L and 54R, and is output to the outside of the distance measuring unit 5. The distance measuring light thus output is reflected by the bend mirror 59 and the optical member 35a in the downstream merging mechanism 35, and is incident to the laser light scanning section 4.

The distance measuring light incident to the laser light scanning section 4 is sequentially reflected by the first mirror 41a of the first scanner 41 and the second mirror 42a of the second scanner 42, and is emitted from the light-transmissive window 19 to the outside of the marker head 1.

As described in the description of the laser light scanning section 4, it is possible to scan the distance measuring light in the first direction on the surface of the workpiece W by adjusting the rotation posture of the first mirror 41a of the first scanner 41. At the same time, it is possible to scan the distance measuring light in the second direction on the surface of the workpiece W by operating the motor of the second scanner 42 to adjust the rotation posture of the second mirror 42a.

The distance measuring light thus scanned is reflected on the surface of the workpiece W. A part of the distance measuring light thus reflected (hereinafter, also referred to as "reflected light") is incident to the inside of the marker head 1 through the light-transmissive window 19. The reflected light that has been incident to the inside of the marker head 1 returns to the laser light guide section 3 via the laser light scanning section 4. The reflected light has the same wavelength as the distance measuring light, and thus, is reflected by the optical member 35a of the downstream merging mechanism 35 in the laser light guide section 3 and is incident to the distance measuring unit 5 via the bend mirror 59.

—Distance Measuring Light Receiving Section 5B—

The distance measuring light receiving section 5B is provided inside the housing 10, and is configured to receive distance measuring light (equivalent to the above-described "reflected light") emitted from the distance measuring light emitting section 5A and reflected by the workpiece W.

Specifically, the distance measuring light receiving section 5B has the pair of light receiving elements 56L and 56R and the light receiving lens 57. Each of the pair of light receiving elements 56L and 56R are arranged at a rear end of the support base 50, and the light receiving lens 57 is arranged at a front end of the support base 50, respectively. Therefore, the pair of light receiving elements 56L and 56R and the light receiving lens 57 are arrayed substantially along the longitudinal direction of the housing 10 and the support base 50.

The pair of light receiving elements 56L and 56R are arranged inside the housing 10 such that the respective optical axes thereof sandwich the optical axis Ao of the distance measuring light in the distance measuring light emitting section 5A. Each of the pair of light receiving elements 56L and 56R receives the reflected light that has returned to the laser light scanning section 4.

Specifically, the pair of light receiving elements 56L and 56R are arrayed in a direction orthogonal to the optical axis Ao of the distance measuring light emitting section 5A. In this embodiment, the array direction of the pair of light receiving elements 56L and 56R is equal to the lateral direction of the housing 10 and the support base 50, that is, the left-right direction. In the same direction, one light receiving element 56L is arranged on the left side of the distance measuring light source 51, and the other light receiving element 56R is arranged on the right side of the distance measuring light source 51.

The pair of light receiving elements 56L and 56R have light receiving surfaces oriented diagonally forward, respectively, and detect light reception positions of the reflected light on the respective light receiving surfaces, and output signals (detection signals) indicating the detection results. The detection signals output from the respective light receiving elements 56L and 56R are input to the marker controller 100 and reach the distance measurement section 103.

Examples of elements that can be used as the light receiving elements 56L and 56R include a CMOS image sensor formed of a complementary MOS (CMOS), a CCD image sensor formed of a charge-coupled device (CCD), a position sensitive detector (PSD), and the like.

In this embodiment, each of the light receiving elements 56L and 56R is configured using a CMOS image sensor. In this case, each of the light receiving elements 56L and 56R can detect not only the light reception position of the reflected light but also a light reception amount distribution (light receiving waveform) thereof. That is, when each of the light receiving elements 56L and 56R is configured using the CMOS image sensor, pixels are arrayed in at least the left-right direction on each of the light receiving surfaces. In this case, each of the light receiving elements 56L and 56R can read and amplify a signal for each pixel and output the signal to the outside. The intensity of the signal in each of the pixels is determined based on the intensity of reflected light at a spot when the reflected light forms the spot on the light receiving surface.

When each light receiving element 56L and 56R is configured using an element capable of detecting the light reception amount distribution (light receiving waveform), such as a CMOS image sensor, the magnitude of the light reception amount in each of the light receiving elements 56L and 56R can be adjusted using the intensity of distance measuring light, that is, the intensity of distance measuring light emitted from the distance measuring light emitting section 5A (hereinafter, this is also referred to as "projected light amount") and a gain at the time of amplifying a signal for each pixel (hereinafter, this is also referred to as a "light reception gain"). In addition to the gain, an exposure time of each of the light receiving elements 56L and 56R can be used for adjustment.

The pair of light receiving elements 56L and 56R according to this embodiment can detect at least a peak position indicating the light reception position of the reflected light and the light reception amount of the reflected light. As an index indicating the light reception amount, for example, the height of the peak in the light reception amount distribution of the reflected light can be used. Instead, a summed value, an average value, and an integrated value of the light reception amount distribution may be used.

Although the peak position of the light reception amount distribution (the peak position of the spot) is used as an index indicating the light reception position of the reflected light in this embodiment, a barycentric position of the light reception amount distribution may be used instead.

The light receiving lens 57 is arranged inside the housing 10 so as to allow passage of each of the optical axes of the pair of light receiving elements 56L and 56R. The light receiving lens 57 is also provided in the middle of an optical path connecting the downstream merging mechanism 35 and the pair of light receiving elements 56L and 56R, and can collect the reflected light that has passed through the downstream merging mechanism 35 on the respective light receiving surfaces of the pair of light receiving elements 56L and 56R.

The light receiving lens 57 collects the reflected light that has returned to the laser light scanning section 4 and forms a spot of the reflected light on the light receiving surface of each of the light receiving elements 56L and 56R. The respective light receiving elements 56L and 56R output signals indicating a peak position of the spot thus formed and the light reception amount to the distance measurement section 103.

Basically, the laser processing apparatus L can measure the distance to the surface of the workpiece W based on the light reception position of the reflected light (the position of the peak of the spot in this embodiment) on the light receiving surface of each of the light receiving elements 56L and 56R. A so-called triangulation method is used as a distance measurement method.

—Regarding Distance Measurement Method—

Figure 9:
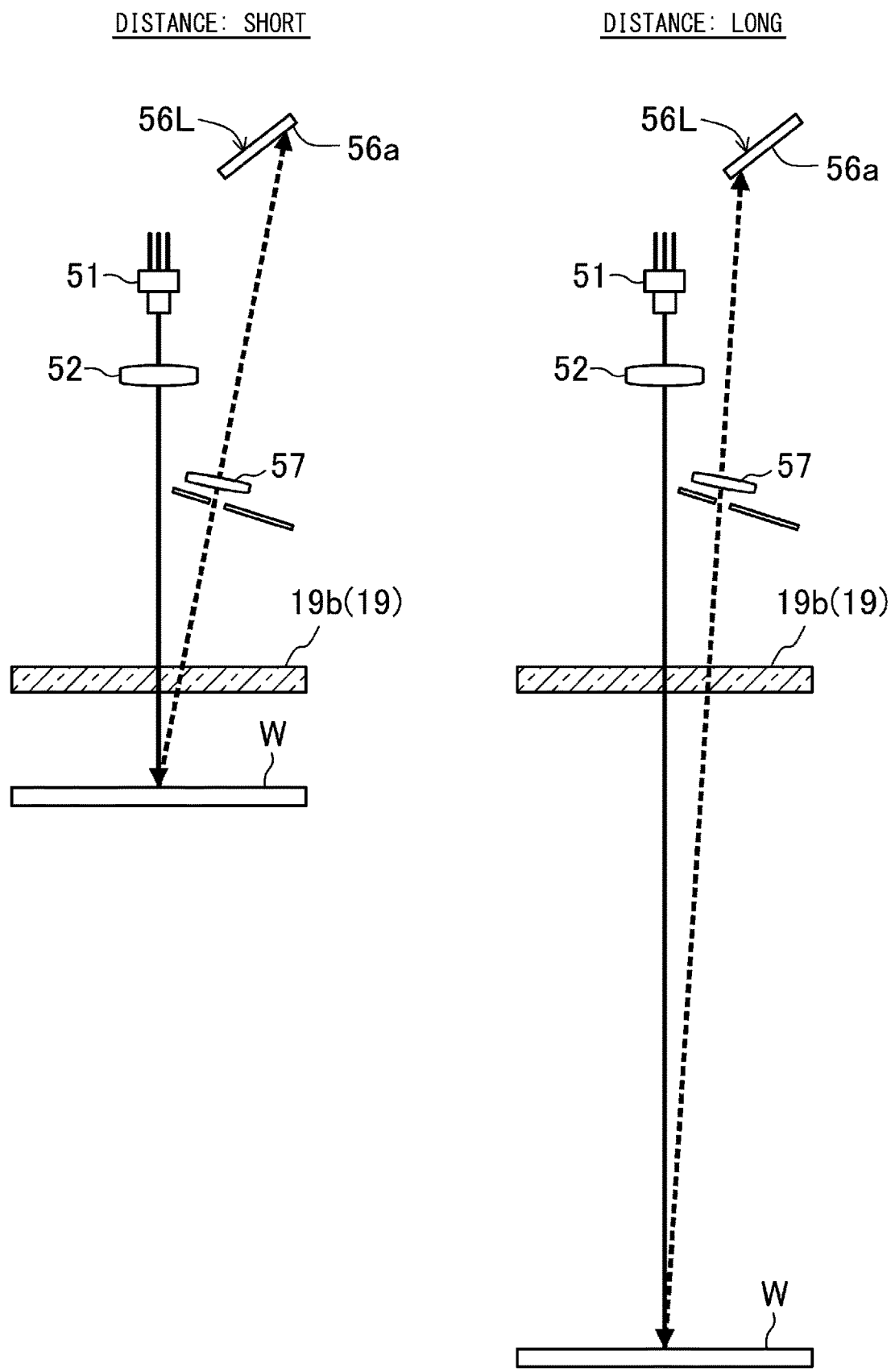
FIG. 9 is a view illustrating a triangulation method.

FIG. 9 is a view illustrating the triangulation method. Although FIG. 9 illustrates only the distance measuring unit 5, the following description is common to the case where distance measuring light is emitted via the laser light scanning section 4 as described above.

As illustrated in FIG. 9, when distance measuring light is emitted from the distance measuring light source 51 in the distance measuring light emitting section 5A, the surface of the workpiece W is irradiated with the distance measuring light. When the distance measuring light is reflected by the workpiece W, the reflected light (especially diffused and reflected light) propagates isotropically if the influence of specular reflection has been eliminated.

Although the reflected light propagating in this manner contains a component incident to the light receiving element 56L via the light receiving lens 57, an angle of incidence of the incident light to the light receiving element 56L increases or decreases depending on the distance between the marker head 1 and the workpiece W. When the angle of incidence with respect to the light receiving element 56L increases or decreases, a light reception position on a light receiving surface 56a is displaced.

In this manner, the distance between the marker head 1 and the workpiece W and the light reception position on the light receiving surface 56a are associated with each other in a predetermined relationship. Therefore, when such a relationship is grasped in advance and stored in the marker controller 100, for example, the distance between the marker head 1 and the workpiece W can be calculated from the light reception position on the light receiving surface 56a. Such a calculation method is nothing but a method using a so-called triangulation method.

That is, the distance measurement section 103 measures the distance from the laser processing apparatus L to the surface of the workpiece W by the triangulation method based on the light reception position of the distance measuring light in the distance measuring light receiving section 5B.

Specifically, the condition setting storage section 102 stores, in advance, the relationship between the light reception position on the light receiving surface 56a and the distance from the marker head 1 to the surface of the workpiece W. On the other hand, a signal, which indicates the light reception position of the distance measuring light in the distance measuring light receiving section 5B, specifically, a position of a peak of a spot formed on the light receiving surface 56a by the reflected light of the distance measuring light, is input to the distance measurement section 103.

The distance measurement section 103 measures the distance to the surface of the workpiece W based on the signal thus input and the relationship stored in the condition setting storage section 102. The measurement value thus obtained is input to, for example, the control section 101, and is used by the control section 101 to control the Z scanner 33 and the like.

For example, the laser processing apparatus L automatically or manually determines a site (printing point) to be processed by the marker head 1 on the surface of the workpiece W. Subsequently, the laser processing apparatus L measures the distance to each printing point (more accurately, a distance measuring point set around the printing point) prior to execution of printing, and determines control parameters of the Z scanner 33 such that a focal position is commensurate with the measured distance. The laser processing apparatus L operates the Z scanner 33 based on the control parameters thus determined, and then performs printing on the workpiece W with near-infrared laser light.

Hereinafter, a specific method for using the laser processing system S will be described.

<Regarding Method for Using Laser Processing System S>

Figure 10:
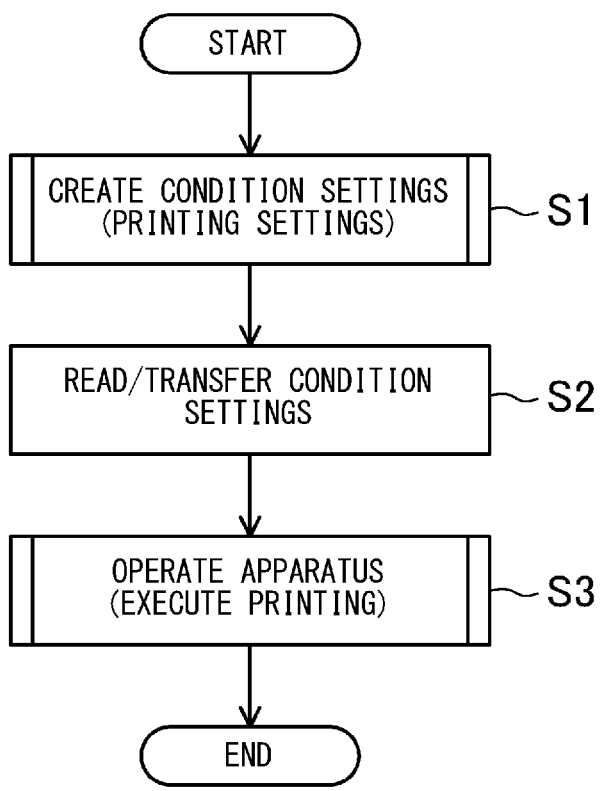
FIG. 10 is a flowchart illustrating a method for using the laser processing system.
Figure 11:
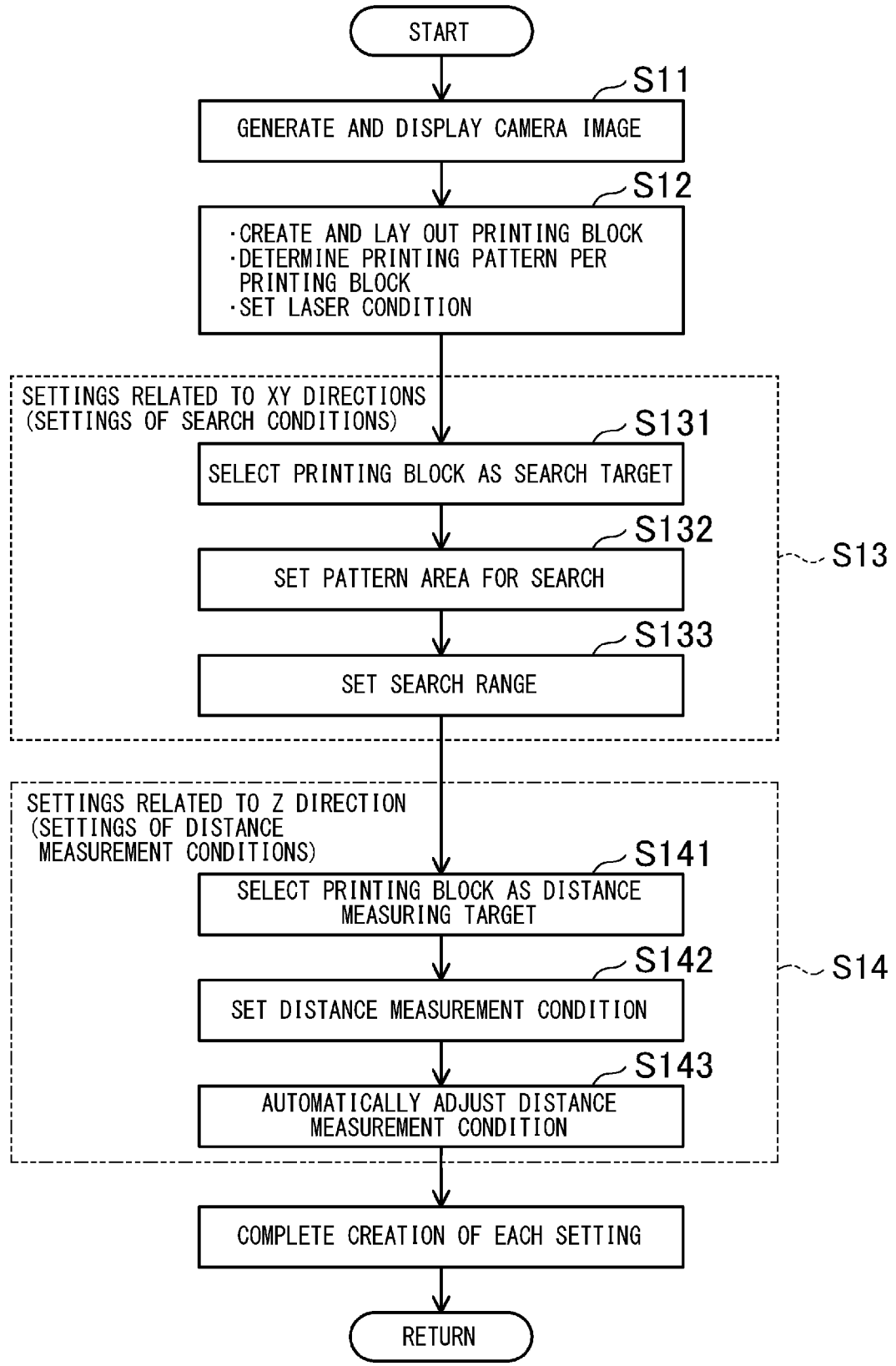
FIG. 11 is a flowchart illustrating a procedure for creating printing settings, search settings, and distance measurement settings.
Figure 13:
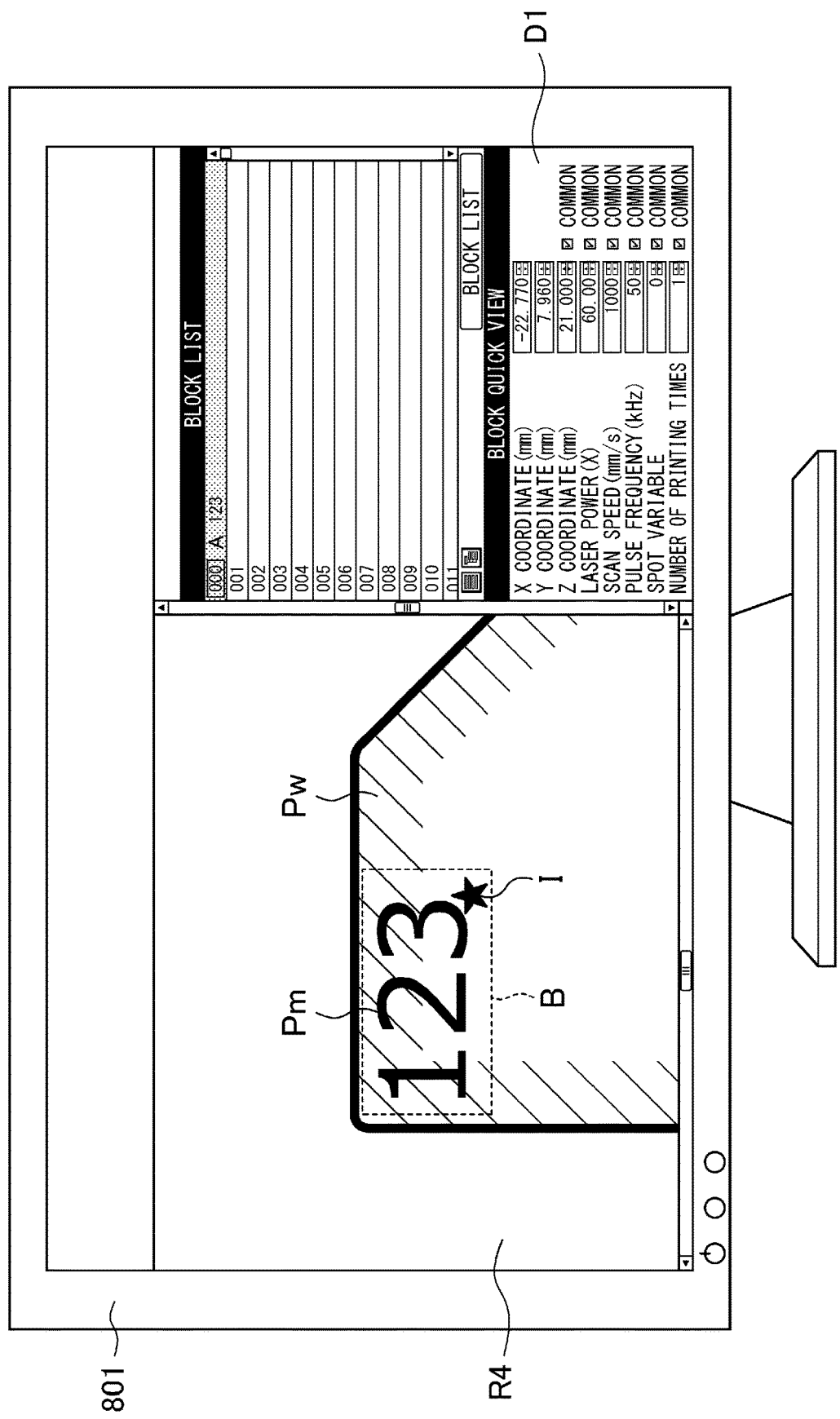
FIG. 13 is a view illustrating a display content on a display section.

FIG. 10 is a flowchart illustrating a method for using the laser processing system S. FIG. 11 is a flowchart illustrating a procedure for creating printing settings, search settings, and distance measurement settings, FIG. 12 is a view illustrating a relationship between the processing area R1 and a setting plane R4, and FIG. 13 is a view illustrating a display content on the display section 801.

Figure 14A:
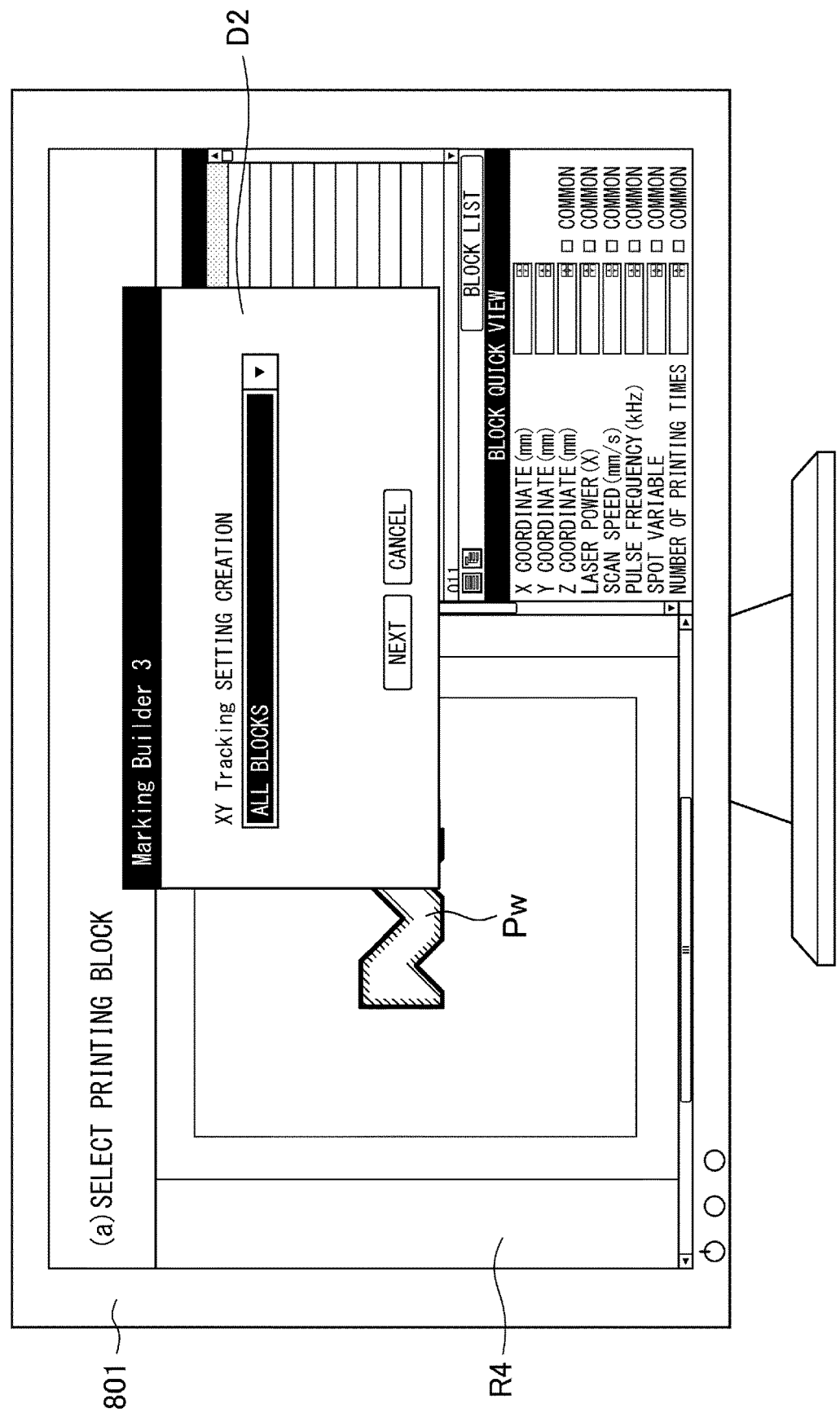
FIG. 14A is a view illustrating a specific procedure for setting search conditions.
Figure 14B:
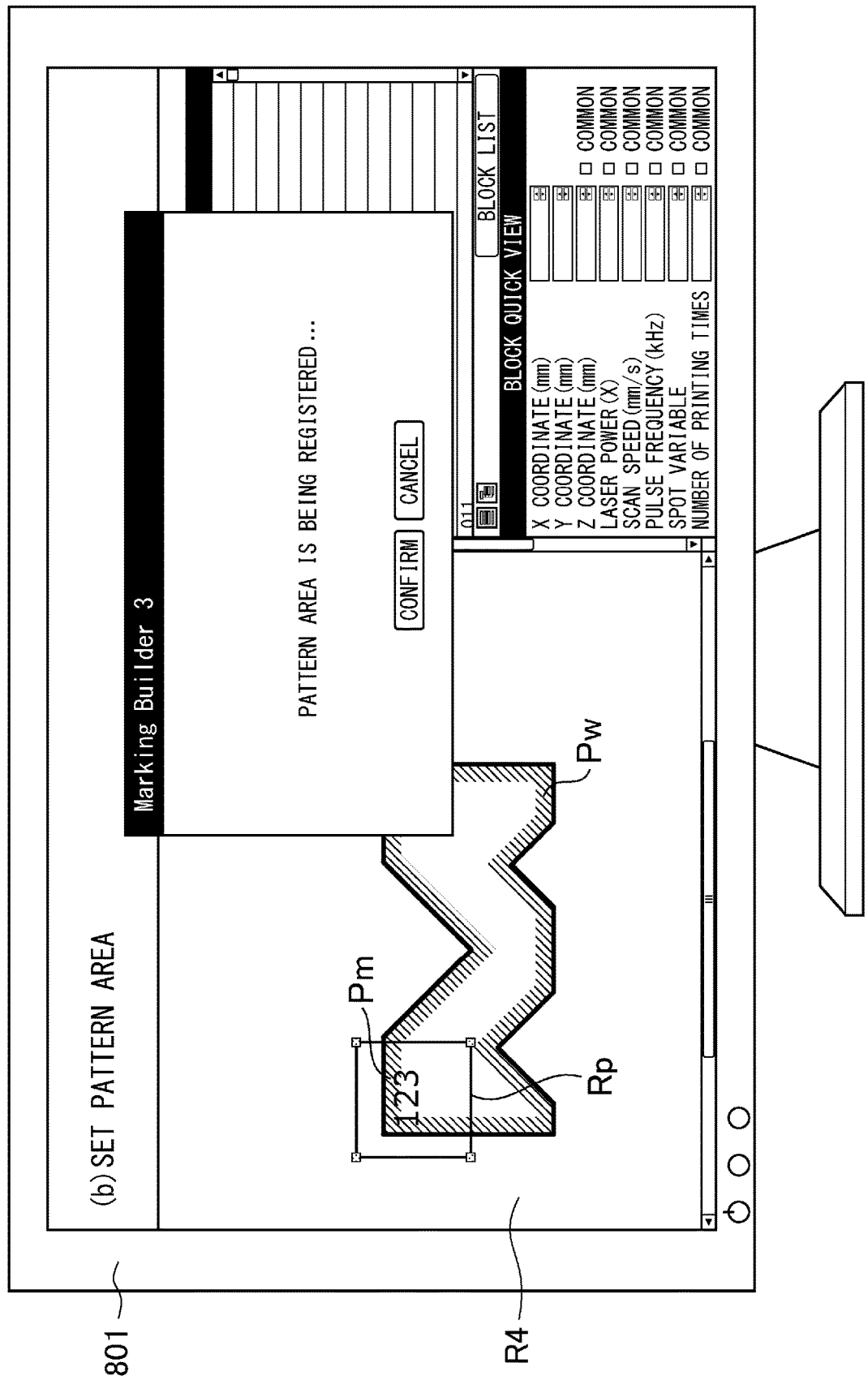
FIG. 14B is a view illustrating the specific procedure for setting the search conditions.
Figure 14D:
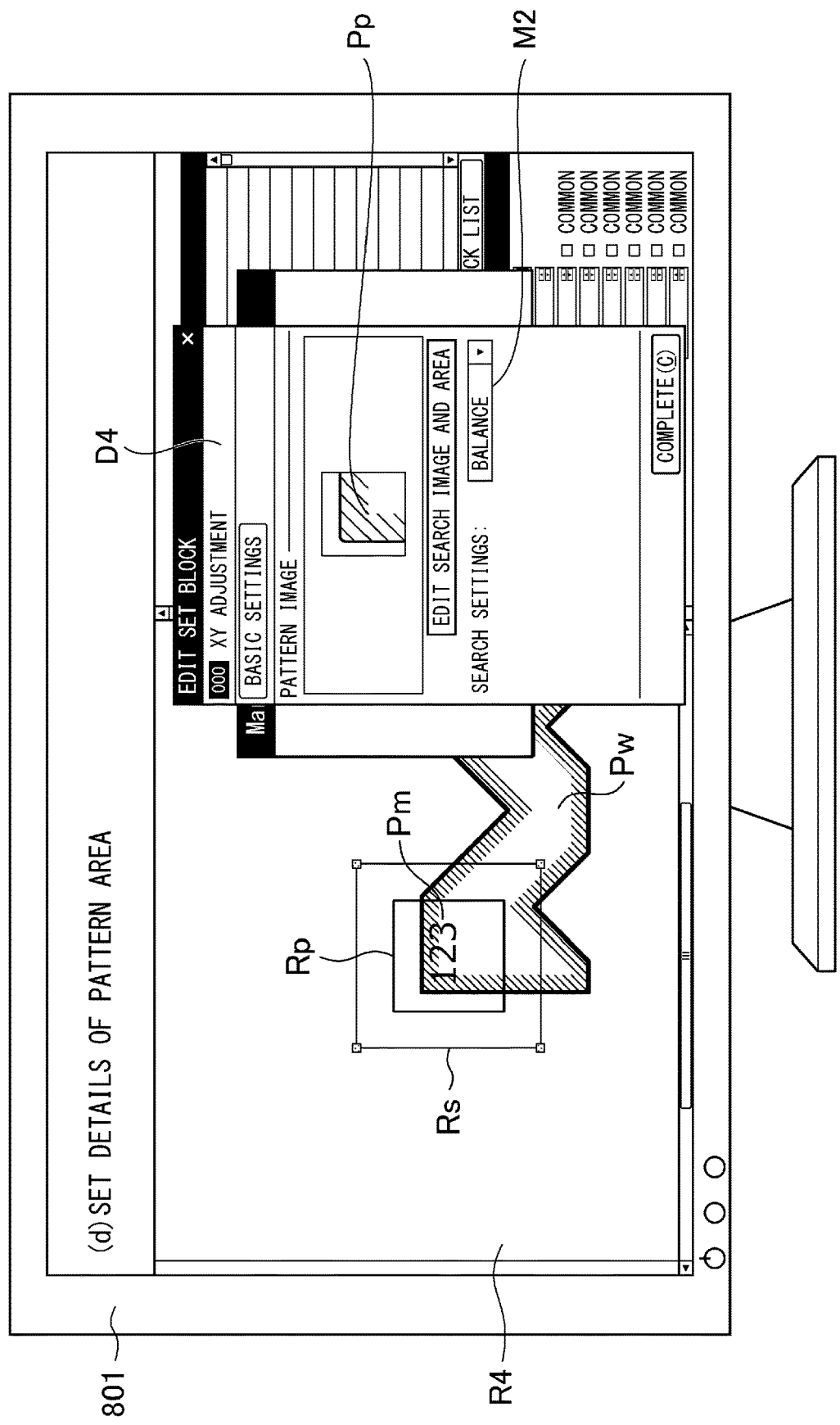
FIG. 14D is a view illustrating the specific procedure for setting the search conditions.
Figure 15B:
FIG. 15B is a view illustrating the specific procedure for setting the distance measurement conditions.
Figure 15D:
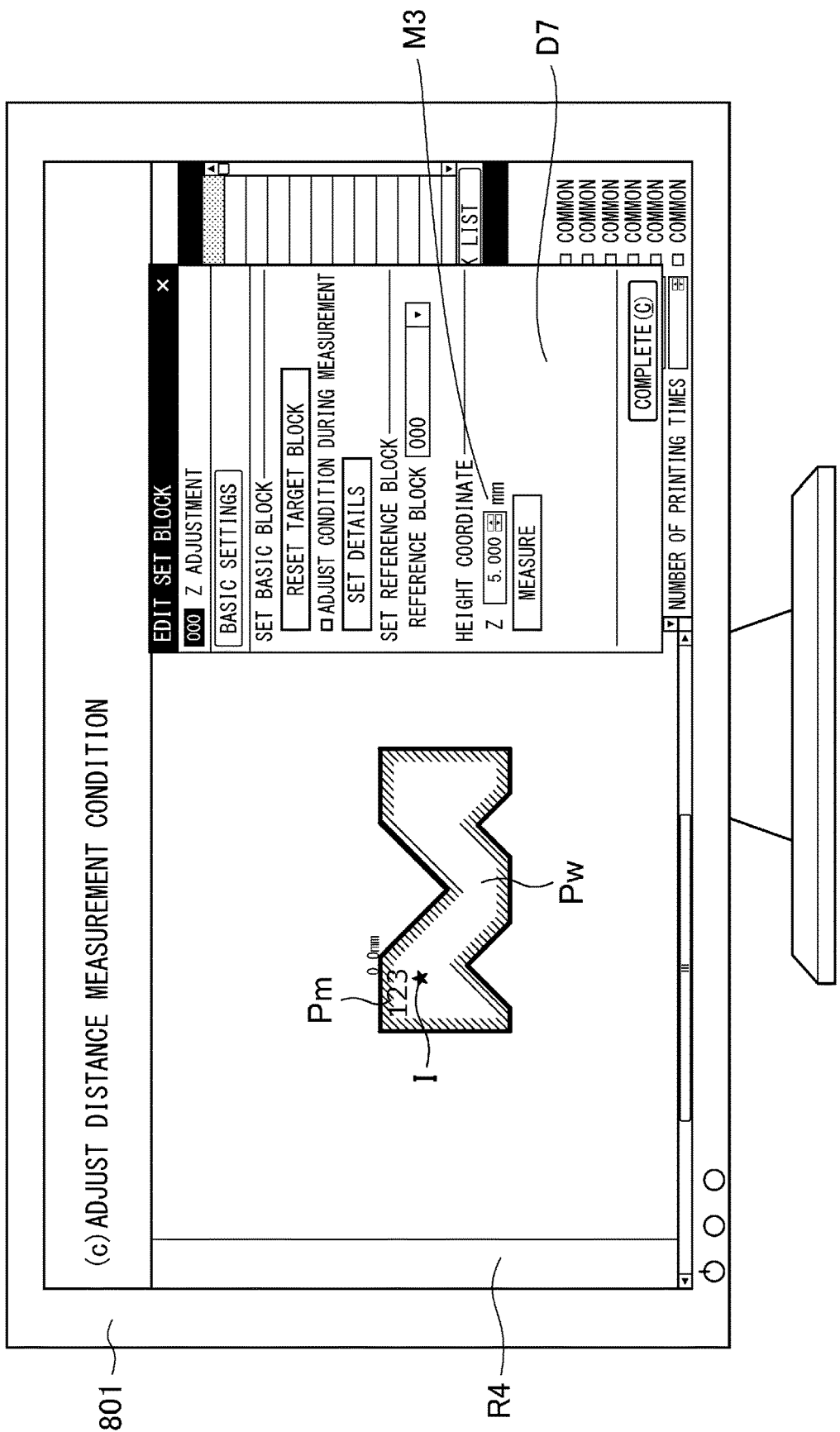
FIG. 15D is a view illustrating the specific procedure for setting the distance measurement conditions.
Figure 16:
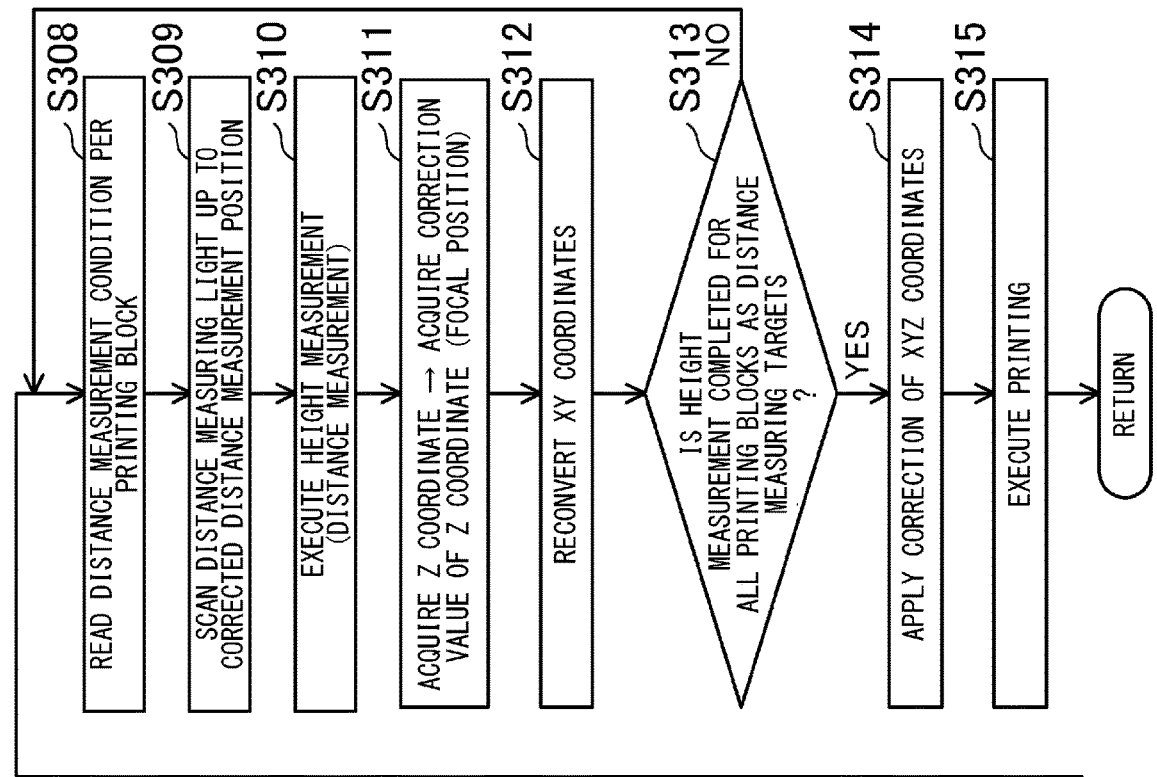
FIG. 16 is a flowchart illustrating a procedure for operating the laser processing apparatus.
Figure 16:
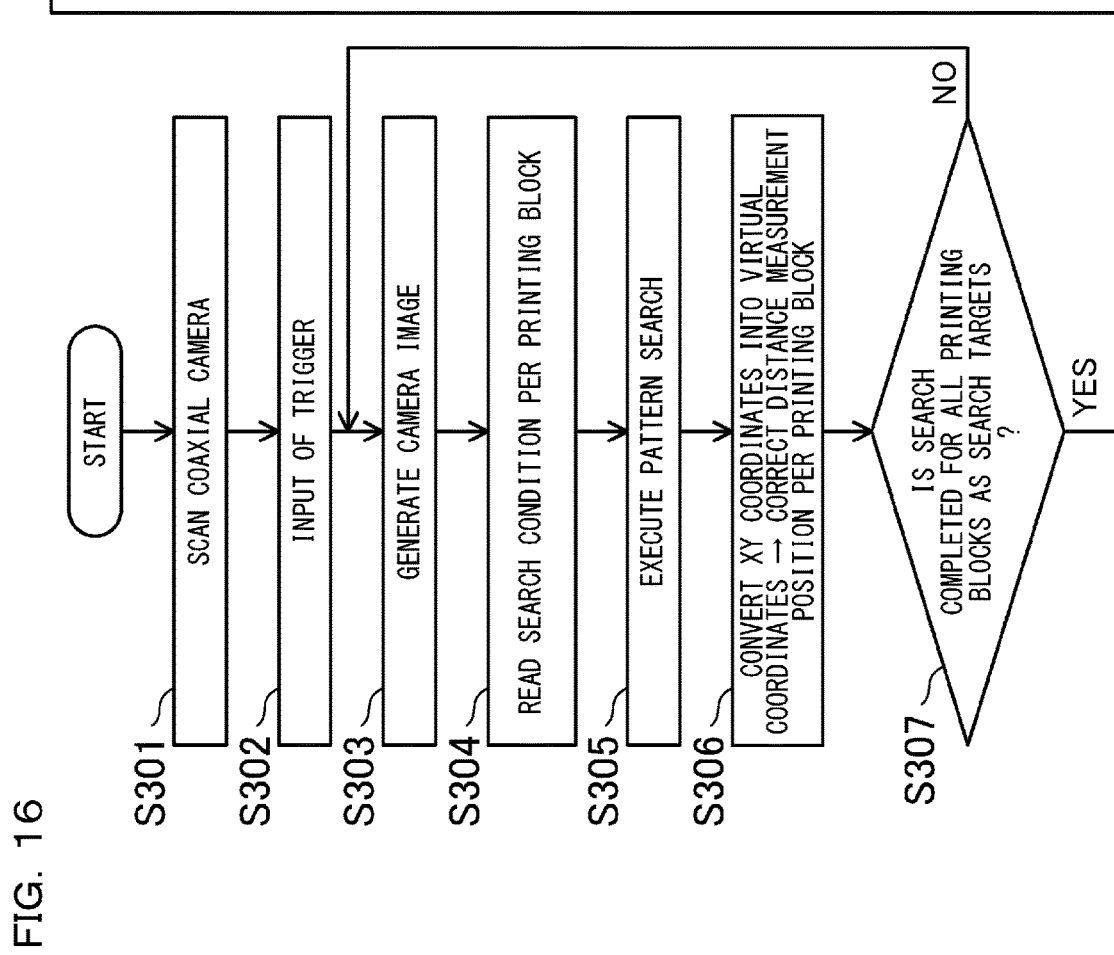
Figure 17C:
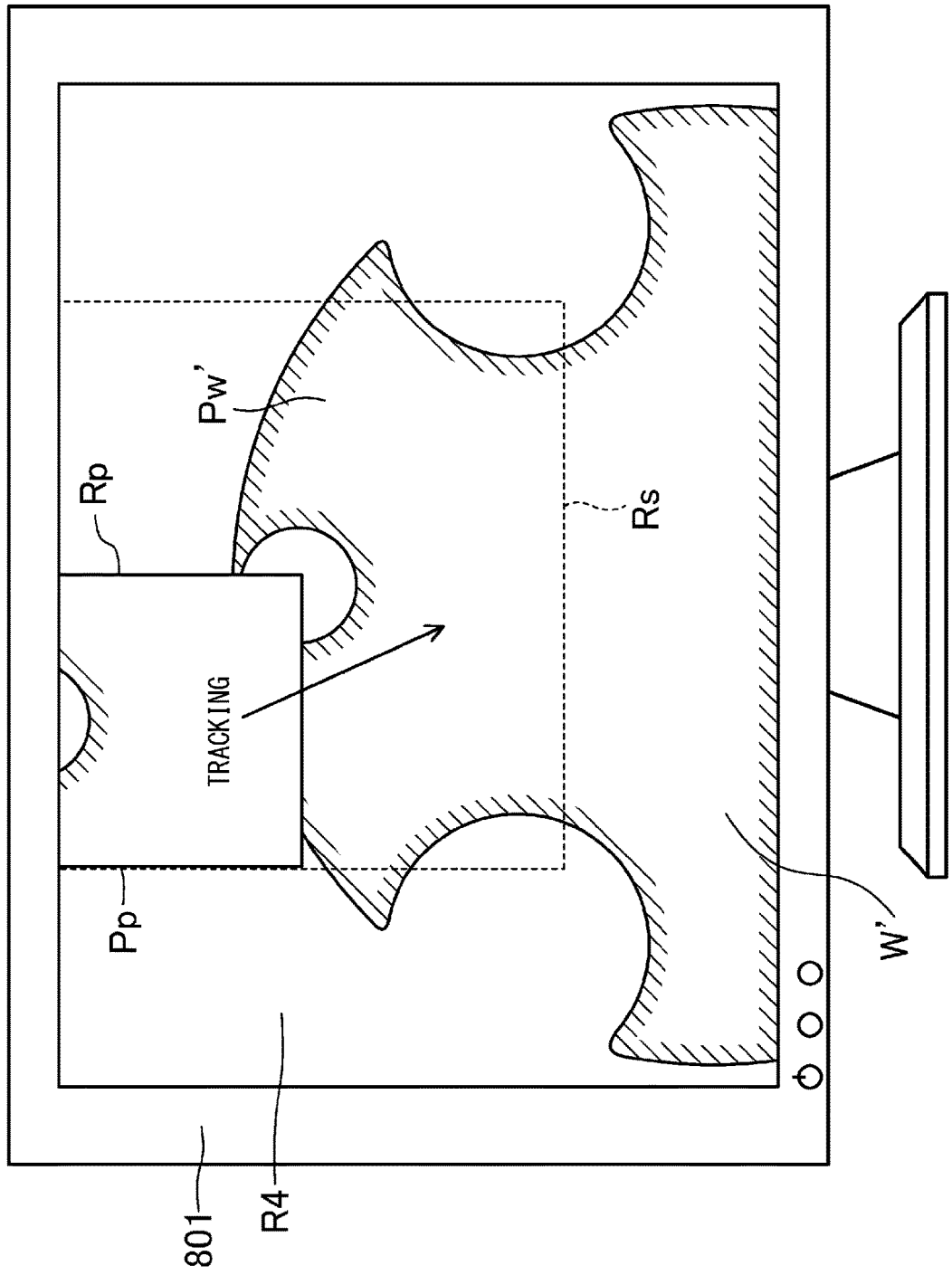
FIG. 17C is a view illustrating the specific procedure of the pattern search.
Figure 18:
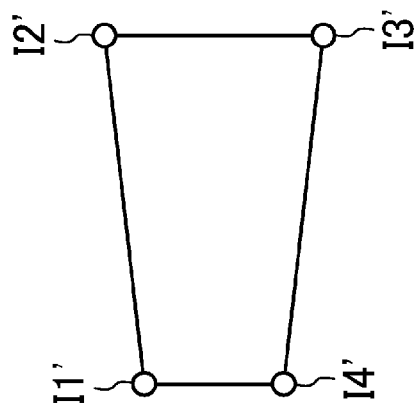
FIG. 18 is a view illustrating keystone correction.
Figure 18:
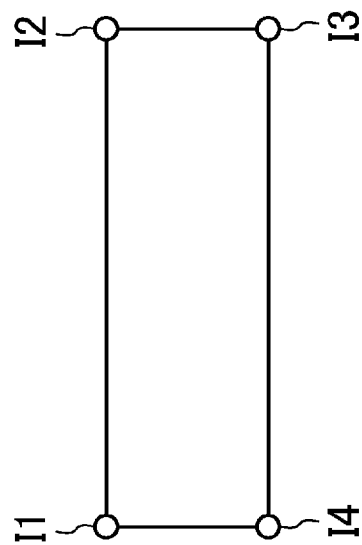
Figure 19:
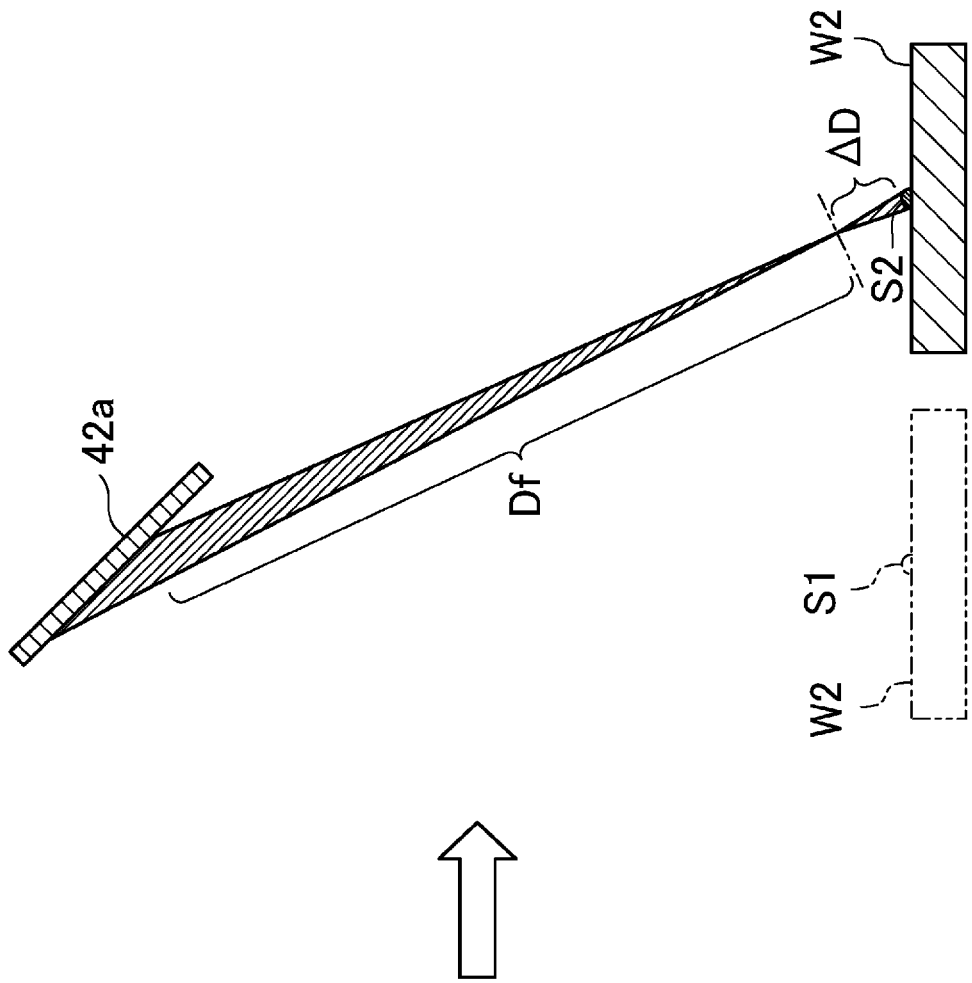
FIG. 19 is a view illustrating a relationship between a misalignment of a workpiece and a focal position.
Figure 19:
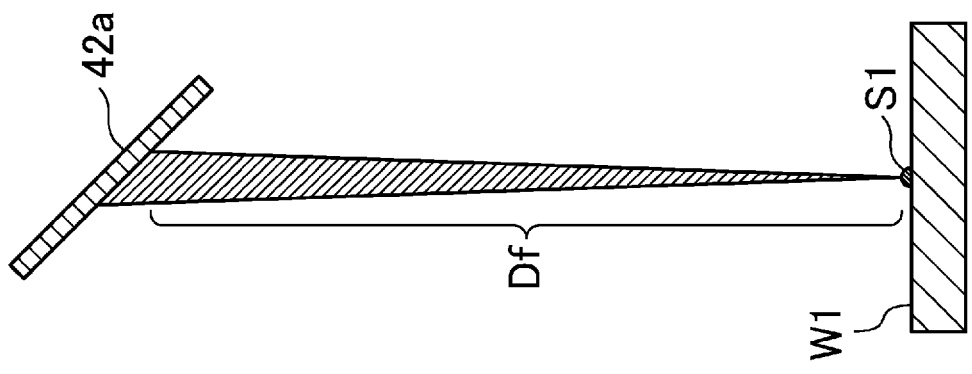

FIGS. 14A to 14D are views illustrating a specific procedure for setting search conditions, FIGS. 15A to 15D are views illustrating a specific procedure for setting distance measurement conditions, FIG. 16 is a flowchart illustrating a procedure for operating the laser processing apparatus L, FIGS. 17A to 17D are views illustrating a specific procedure for pattern search, FIG. 18 is a view for describing keystone correction, and FIG. 19 is a view illustrating a relationship between a misalignment of a workpiece and a focal position.

The laser processing system S including the laser processing apparatus L configured as the laser marker can be installed and operated, for example, on a manufacturing line of a factory. When being operated, first, condition settings, such as an installation position of the workpiece W which is to flow through the line, and each output of near-infrared laser light and distance measuring light with which the workpiece W is irradiated, are created prior to the operation of the manufacturing line (Step S1).

A setting content created in Step S1 is transferred to and stored in the marker controller 100 and/or the operation terminal 800 or is read by the marker controller 100 immediately after creation (Step S2).

Then, when the manufacturing line is operated, the marker controller 100 refers to the setting content stored in advance or read immediately after the creation. The laser processing apparatus L is operated based on the setting content that has been referred to, and executes printing on each workpiece W flowing on the line (Step S3).

(Specific Procedure for Creating Each Setting)

FIG. 11 illustrates a specific process in Step S1 of FIG. 10. As illustrated in FIG. 11, a control process related to the printing settings, a control process related to the search settings, and a control process related to the distance measurement settings are executed in order in this embodiment. The respective control processes are configured as independent processes without overlapping with each other.

First, in Step S11, the coaxial camera 6 or the wide area camera 7 built in the laser processing apparatus L generates the captured image Pw including at least a part of the processing area R1. The captured image Pw generated by the coaxial camera 6 or the wide area camera 7 is output to the operation terminal 800.

The display section 801 of the operation terminal 800 displays the setting plane R4 associated with the processing area R1 and also displays the captured image Pw on the setting plane R4 (see FIG. 13). As a result, a coordinate system (printing coordinate system) defined on the setting plane R4 in the display section 801 and a coordinate system (camera coordinate system) defined on the captured image Pw can be associated with each other. For example, a user can perform printing on the processing area R1 through the setting plane R4 by designating a printing point while looking at the captured image Pw.

—Creation of Printing Settings—

In the subsequent Step S12, the setting section 107 sets processing conditions. The setting section 107 sets the processing conditions by reading a storage content in the condition setting storage section 102 or the like, or by reading an operation input or the like via the operation terminal 800.

The processing conditions include a printing pattern (marking pattern) Pm indicating a printing content or the like, and a printing block B indicating a position of this printing pattern Pm. The processing conditions can be used to adjust a layout, a size, a rotation posture, or the like of the printing block B and the printing pattern Pm. Further, the printing block B is used in association with a distance measurement position I to be described later.

The display section 801 can display the printing pattern Pm and the printing block B to overlap with the captured image Pw. For example, in FIG. 13, the printing pattern Pm including numbers "123" and the rectangular printing block B that surrounds this are arranged on the setting plane R4 on the surface of the workpiece W, and the display section 801 displays the printing pattern Pm and the printing block B thus arranged so as to overlap with the captured image Pw.

Note that the printing pattern Pm is an example of the "processing pattern", and the printing block B is an example of the "processing block". The names "printing pattern" and "printing block" are given merely for convenience, and are not intended to limit their applications.

Although not illustrated, a plurality of workpiece Ws may be displayed on the setting plane R4, and only one workpiece W may be displayed as illustrated in FIG. 13. Further, a plurality of printing blocks B may be arranged on one workpiece W. Regarding the printing pattern Pm, a pattern other than a character string such as a QR code (registered trademark) can be used.

Returning to Step S12 in FIG. 11, for example, a user manually creates the printing block B and arranges this printing block B on the setting plane R4 in the same step. Since the setting plane R4 and the captured image Pw are associated with each other as described above, the user can arrange the printing block B while visually recognizing the captured image Pw.

When one or a plurality of printing blocks B are arranged in this manner, the user determines the printing pattern Pm per printing block B. The printing pattern Pm is determined, for example, as the user operates the operation section 802 and the operation section 802 inputs the printing pattern Pm to the marker controller 100 based on the operation input at that time.

The setting section 107 reads the printing blocks B thus arranged and the printing pattern Pm determined per printing block B to be set as the processing conditions. The setting section 107 according to this embodiment temporarily or consistently stores coordinates (coordinates in the printing coordinate system) of the printing block B on the setting plane R4 and the like in the condition setting storage section 102 and the like.

Since the setting plane R4 is displayed so as to overlap with the captured image Pw as described above, the setting section 107 according to this embodiment sets the printing block B so as to overlap with the captured image Pw. The setting section 107 is an example of a "processing block setting section" in this embodiment.

The processing conditions also include conditions related to near-infrared laser light (hereinafter referred to as "laser conditions"). These laser conditions include at least one of an emission position of the near-infrared laser light, a target output (laser power) of the near-infrared laser light, a scanning speed (scan speed) of the near-infrared laser light by the laser light scanning section 4, a repetition frequency (pulse frequency) of the near-infrared laser light, whether or not a laser spot of the near-infrared is laser light variable (spot variability), and the number of times the near-infrared laser light traces the printing pattern Pm (number of printing times). As illustrated in a menu D1 displayed at the lower right of FIG. 13, such processing conditions can be set per printing block B.

—Creation of Search Settings—

In general, misalignments occur in the X direction and the Y direction (XY direction) among the respective workpieces W to be sequentially processed when the manufacturing line is operated. The laser processing apparatus L according to this embodiment can correct such a misalignment using various methods.

Therefore, in Step S13 subsequent to Step S12, the setting section 107 creates condition settings (search settings) to correct the misalignments in the XY directions. The laser processing apparatus L according to this embodiment is configured to use a pattern search as a method for correcting the misalignments in the XY directions.

In order to use the pattern search, the setting section 107 sets a pattern area Rp for identifying a position of the workpiece W and a search area Rs defined as a movement range of the pattern area Rp on the captured image Pw as conditions (search conditions) related to the pattern search. Note that the pattern area Rp is an example of a "correction area" in this embodiment.

In addition, the marker controller 100 includes the characteristic amount extraction section 105 that extracts image information (a characteristic amount) of the captured image Pw in the pattern area Rp in order to actually perform the pattern search (see FIG. 2). The characteristic amount extraction section 105 according to this embodiment cuts out the captured image Pw itself in the pattern area Rp as the image information of the captured image Pw. The setting section 107 sets an image cut out by the characteristic amount extraction section 105 as a pattern image Pp. The condition setting storage section 102 stores the pattern image Pp set by the setting section 107 (see FIG. 14D). The condition setting storage section 102 is an example of a "storage section" in this embodiment.

Hereinafter, a specific procedure for setting the search conditions will be described with reference to FIGS. 14A to 14D.

First, in the first sub-step (Step S131) in Step S13, the printing block B which is a search target of the pattern search is determined. Specifically, in the example illustrated in FIG. 14A, it is possible to select whether all the printing blocks B are set as search targets or a specific printing block B is set as a search target by executing a pull-down operation on a dialog D2.

Subsequently, in the second sub-step (Step S132) in Step S13, the setting section 107 sets the pattern area Rp on the captured image Pw. Specifically, in the example illustrated in FIG. 14B, the pattern area Rp corresponding to each printing block B is set by executing a drag operation or the like on the captured image Pw.

Although the pattern area Rp is set so as to surround the printing pattern Pm in the example illustrated in FIG. 14B, the setting is not limited to such setting. The pattern area Rp can be set so as not to surround the printing pattern Pm.

Further, the characteristic amount extraction section 105 cuts out the captured image Pp in the pattern area Rp and sets the cut captured image as the image information (pattern image Pp) (see FIG. 14D). The pattern image Pp thus set is input to the setting section 107 and the like.

Subsequently, in the third sub-step (Step S133) in Step S13, the setting section 107 sets the search area Rs on the captured image. Specifically, FIG. 14C illustrates an example in which the pattern area Rp is expanded in the horizontal and vertical directions by the amount of a numerical value input in an input field M1 by inputting the numerical value in the input field M1 provided on a dialog D3, and the area thus expanded is set to the search area Rs. The set search area Rs is stored in the condition setting storage section 102 and the like. For example, the search area Rs illustrated in FIG. 14C is an area obtained by expanding the pattern area Rp vertically and horizontally each by about 5 mm.

As illustrated in FIG. 14D, the pattern image Pp as the image information can be confirmed and the search settings can be set in more detail by displaying a dialog D4 on the display section 801.

For example, the user can operate a pull-down menu for search settings M2 on the dialog D4 to select a mode (speed priority mode) of reducing the pattern area Rp and the pattern image Pp and executing pattern search at higher speed, to select a mode (precision priority mode) of executing pattern search with higher precision without reducing the pattern area Rp and the pattern image Pp, or to select an intermediate mode (balance mode) of giving priority to speed slightly over the precision priority mode while giving priority to precision slightly over the speed priority mode as in the illustrated example.

The search conditions set in this manner are stored in the condition setting storage section 102 or the like as the search settings. When the creation of the search setting is completed, the setting section 107 proceeds from Step S13 to Step S14.

—Measurement of Distance Measurement Settings—

In general, a misalignment occurs in the Z direction among the respective workpieces W to be sequentially processed when the manufacturing line is operated. Such a misalignment causes a shift of a focal position of near-infrared laser light, which is not desirable. Since the laser processing apparatus L according to this embodiment includes the distance measuring unit 5, and thus, can detect the misalignment in the Z direction based on the distance to the surface of the workpiece W. As a result, it is possible to correct the misalignment in the Z direction, and further, the shift of the focal position. Therefore, in Step S14 subsequent to Step S13, the condition settings (distance measurement settings) to correct the misalignment in the Z direction are created.

Specifically, in Step S14, conditions (distance measurement conditions) related to the distance measuring unit 5 are determined. The setting section 107 according to this embodiment sets at least the distance measurement position I for measurement of the distance from the marker head 1 to the surface of the workpiece W on the captured image Pw as the distance measurement condition. The distance measurement position I is basically set so as to overlap with the surface of the workpiece W, and indicates coordinates to which distance measuring light needs to be emitted.

When a plurality of printing blocks B are set, the setting section 107 can set the distance measurement condition per printing block B. In this case, the setting section 107 can set the distance measurement position I within each of the printing blocks B (see the star mark in FIG. 13). Instead, the setting section 107 may set the distance measurement position I outside each of the printing blocks B.

Hereinafter, a specific procedure for setting the distance measurement conditions will be described with reference to FIGS. 15A to 15D.

First, in the first sub-step (Step S141) in Step S14, the printing block B which is a distance measurement target (distance measuring target) is determined. Specifically, in the example illustrated in FIG. 15A, it is possible to select whether to set all the printing blocks B as distance measuring targets, whether to set a specific printing block B as a distance measuring target, or whether to set no distance measuring target (no target) by executing a pull-down operation on a dialog D5. When "no target" is selected, the distance measurement is performed, but the measurement result is not used for position correction in the Z direction.

In the example illustrated in FIG. 15A, an inclination of the workpiece W can be detected instead of measuring the distance (height) by executing a pull-down operation. In the case of detecting the inclination of the workpiece W, the distance measurement positions I are set over at least three locations. The inclination of the surface of the workpiece W can be detected by measuring the distance over the three points. The laser processing apparatus L can correct the inclination of the workpiece W with respect to the XY plane in addition to the misalignment of the workpiece W in the Z direction.

Subsequently, in the second sub-step (Step S142) in Step S14, the setting section 107 sets the distance measurement condition per printing block B. Specifically, as illustrated in FIG. 15B, it is possible to perform selection on a dialog D6 between two patterns of a pattern for designating an identification number (block number) of the printing block B and a pattern for designating arbitrary coordinates irrelative to the printing block B. When the former pattern is selected, the setting section 107 sets a central portion of the designated printing block B to the distance measurement position I. On the other hand, when the latter pattern is selected, the setting section 107 designates a seat surface designated by a user as the distance measurement position I.

Subsequently, in the third sub-step (Step S143) in Step S14, the setting section 107 automatically adjusts the distance measurement condition (see FIG. 15C). Specifically, the setting section 107 automatically adjusts at least one of the amount of emitted light in the distance measuring light emitting section 5A, the light projection time in the distance measuring light emitting section 5A, and the light reception gain in the distance measuring light receiving section 5B, and the exposure time in the distance measuring light receiving section 5B per printing block B as the distance measurement condition.

As illustrated in FIG. 15D, it is possible to manually change the created distance measurement condition or set the distance measurement condition in more detail by displaying a dialog D7 on the display section 801.

For example, the user can change a reference height in the Z direction (that is, coordinates of the origin in the Z direction) by inputting a number in an item of "Height Coordinates" M3 on the dialog D7.

The distance measurement conditions set in this manner are stored in the condition setting storage section 102 or the like as the distance measurement settings. When the creation of the distance measurement settings is completed, the setting section 107 proceeds from Step S14 to Step S15. The setting section 107 returns from Step S15 assuming that all the settings have been created.

(Execution of Printing)

FIG. 16 illustrates a specific process in Step S3 of FIG. 10. That is, the process illustrated in FIG. 16 is sequentially executed for the respective workpieces W that flow when the manufacturing line is operated.

First, prior to the respective steps illustrated in FIG. 16, the marker controller 100 creates settings such as the printing pattern Pm and the printing block B (printing settings), settings such as the pattern image Pp (search settings), and settings such as the distance measurement position I (distance measurement settings) in advance for a predetermined workpiece W as described with reference to Step S1 in FIG. 10 and Steps S11 to S15 in FIG. 11 (also see FIG. 17A).

When the creation of each setting is completed, the marker controller 100 is in the state of being capable of executing a control process illustrated in FIG. 16. This control process includes, as the main processes, a control process (Steps S303 to S307) for execution of XY tracking (pattern search in the XY directions) and a control process (Step S308 to Step S312) for execution of Z tracking (height measurement in the Z direction).

First, in Step S301 of FIG. 16, the marker controller 100 operates the laser light scanning section 4. The marker controller 100 directs the imaging optical axis A1 of the coaxial camera 6 toward a place where the workpiece W is assumed to be carried at the time of operating the manufacturing line. When the wide area camera 7 is used instead of the coaxial camera 6, Step S301 is unnecessary.

In the subsequent Step S302, if a trigger is input to the marker controller 100 from the PLC 902 or the like, a new workpiece W' different from the workpiece W, used for various settings including the pattern area Rp, is conveyed.

Meanwhile, the printing block B corresponding to the printing pattern Pm is set by the coordinate system defined on the setting plane R4. Further, the latter workpiece W' is likely to be misaligned in the XY directions with respect to the first workpiece W. As illustrated in FIG. 17B, when the misalignment occurs in the XY directions, there is a possibility that it is difficult to form the printing pattern Pm at a desired position on the workpiece W'.

Therefore, the marker controller 100 includes the position correction section 108 in order to perform pattern search and position correction in the XY directions based on the search result for the new workpiece W'.

This position correction section 108 generates a new captured image Pw' using the coaxial camera 6 or the wide area camera 7 at least for the new workpiece W' different from the workpiece W used for setting the pattern area Rp (see FIG. 17B).

The position correction section 108 uses the image information (characteristic amount) extracted by the characteristic amount extraction section 105 and stored in the condition setting storage section 102 on the newly generated captured image Pw' to detect the misalignment of the new workpiece W' in the XY directions.

Specifically, the position correction section 108 moves the pattern area Rp so as to overlap with the newly generated captured image Pw' within the range of the search area Rs set on the setting plane R4 (see FIG. 17C). At substantially the same timing as the movement of the pattern area Rp by the position correction section 108, the characteristic amount extraction section 105 newly extracts image information of the captured image Pw' within the pattern area Rp after the movement. In particular, the characteristic amount extraction section 105 according to this embodiment cuts out an image in the pattern area Rp after the movement from the captured image Pw' and sets the cut image as the newly extracted image information (characteristic amount).

The position correction section 108 compares the image information (pattern image Pp) extracted in advance on the first workpiece W with the image information newly extracted on the new workpiece W' to find out an area where the two pieces of image information match highly as compared to the other area, on the newly generated captured image Pw.

The position correction section 108 considers a difference between coordinates of the pattern area Rp before the movement (coordinates on the setting plane R4) and coordinates of the area where the two pieces of image information match highly as compared to the other area (coordinates on the setting plane R4) as described above as the misalignment between the workpieces W and W' in the XY directions. When the printing block B is moved on the setting plane R4 based on the misalignment detected in this manner, the printing pattern Pm can be formed at a desired position on the newly conveyed workpiece W'.

Specifically, in Step S303 subsequent to Step S302, the marker controller 100 generates the captured image (camera image) Pw' using the coaxial camera 6, and displays the generated captured image Pw' to overlap with the setting plane R4.

Then, in Step S304 subsequent to Step S303, the marker controller 100 reads the search settings (search conditions) for each of the printing blocks B set as search targets.

In the subsequent Step S305, the marker controller 100 executes the pattern search configured as described above. When the pattern search is executed, the misalignments in the XY directions between the workpiece W used to create the printing settings, the search settings, and the distance measurement settings and the workpiece W' newly conveyed during the operation is detected.

At this time, however, the misalignment in the Z direction between the workpieces W and W' has not been resolved. When the misalignment has occurred in the Z direction (when the height of the workpiece W has changed), the misalignments in the XY directions is further generated due to the widening of the angle of view of the coaxial camera 6.

Therefore, the misalignments in the XY directions caused by the height of the workpiece W remains only by moving the printing block B based on the detection result obtained in Step S305.

Therefore, in Step S306 subsequent to Step S305, the position correction section 108 temporarily corrects the misalignments in the XY directions based on the detection result of Step S305.

Specifically, the position correction section 108 shifts the printing coordinate system defined on the setting plane R4 in a direction to reduce the misalignment detected by the position correction section 108. As a result, the initially set XY coordinates can be converted into temporary XY coordinates (temporary coordinates) in which the misalignment has been at least partially reduced.

Since the XY coordinates are converted into temporary coordinates, a position of the printing block B, which has been set using the XY coordinates before the conversion, moves with the conversion into the temporary coordinates (see FIG. 17D).

Meanwhile, each of the printing blocks B is set to be associated with the distance measurement position I as described above. Accordingly, when the XY coordinates are converted into temporary coordinates in Step S306, the distance measurement position I also moves along with the movement of the printing block B. That is, the position correction section 108 corrects the distance measurement position I on the new workpiece W' corresponding to the distance measurement position I set by the setting section 107.

As described above, the position correction section 108 according to this embodiment is configured to correct the position of the printing block B and the distance measurement position I for the workpiece W and the new workpiece W' based on the detection result of the misalignments in the XY directions. Hereinafter, the corrected distance measurement position I will be denoted by reference sign I' (see FIG. 17D).

Then, in Step S307 subsequent to Step S306, the marker controller 100 determines whether or not the pattern search has been completed for all the printing blocks B as search targets, and proceeds to Step S308 if the determination is YES or returns to Step S303 if the determination is NO.

In the subsequent Step S308, the marker controller 100 reads the distance measurement settings (distance measurement conditions) for each of the printing blocks B as distance measuring targets.

In the subsequent Step S309, the control section 101 as the scanning control section controls the laser light scanning section 4 such that the corrected distance measurement position I' is irradiated with distance measuring light. As a result, it is possible to measure the distance from the marker head 1 to the distance measurement position I' reflecting the conversion to the temporary coordinate system.

In the subsequent Step S310, the distance measurement section 103 operates the distance measuring unit 5. At that time, the distance measuring light emitting section 5A measures the distance from the laser processing apparatus L to the surface of the new workpiece W'. Then, the distance measuring light receiving section 5B receives the distance measuring light which has been reflected on the surface of the new workpiece W' and has returned via the laser light scanning section 4. As a result, the distance from the marker head 1 to the distance measurement position I' corrected by the position correction section 108, and further, the height of the workpiece W' at the distance measurement position I' are measured.

In the subsequent Step S311, the marker controller 100 acquires a Z coordinate of the workpiece W' at the distance measurement position I' based on the measurement result by the distance measurement section 103, and detects the misalignment of the workpiece W' in the Z direction. This misalignment can be detected based on a difference between the acquired Z coordinate and the reference height (coordinate of the origin) in the Z direction.

The marker controller 100 acquires control parameters of the Z scanner 33 based on the misalignment of the workpiece W' in the Z direction. The control parameters acquired here correspond to parameters (a Z coordinate and a correction value of a focal position) used when the Z scanner 33 corrects a focal position.

The parameters thus acquired are used for the control of the Z scanner 33 by the control section 101 before executing printing on the workpiece W'. That is, the Z scanner 33 according to this embodiment can adjust the focal position based on the measurement result of the distance measurement section 103 in the state where the distance measurement position I has been corrected by the position correction section 108 prior to the irradiation of the workpiece W' with the near-infrared laser light.

In Step S312 subsequent to Step S311, the marker controller 100 reconverts the XY coordinates based on the misalignment in the Z direction detected in Step S311. Both the misalignments in the XY directions detected by the pattern search and the misalignments in the XY directions caused by the height of the workpiece W are considered for this reconversion. As a result, the misalignment of the workpiece W' in the XY directions can be accurately corrected, and the printing pattern Pm can be formed at a desired position on the workpiece W'.

Then, in Step S313 subsequent to Step S312, the marker controller 100 determines whether or not the height measurement has been completed for all the distance measurement positions I, and proceeds to Step S314 if the determination is YES or returns to Step S308 if the determination is NO.

In Step S314, the position correction section 108 corrects an emission position of near-infrared laser light in the XYZ directions. In this Step S314, both the position correction in the XY directions in which the influence of the height of the workpiece W is added and the position correction in the Z direction based on the height of the workpiece W (that is, the correction of the focal position) are considered.

In Step S315 subsequent to Step S314, the marker controller 100 executes the printing on the workpiece W' using the marker head 1 and returns. Since the misalignments in the XYZ directions have already been corrected, the control section 101 can perform two-dimensional scanning in consideration of the misalignments detected by the position correction section 108.

As described using FIG. 15A, when settings have been made to detect the inclination of the workpiece W, the height measurement is executed at at least three distance measurement positions I. In this case, in Step S314 described above, correction for reduction of the inclination (inclination correction) is executed in addition to the position correction in the XYZ directions. This inclination correction can be executed using, for example, keystone correction of the captured image Pw'.

For example, as illustrated in FIG. 18, it is sufficient to measure the height at the distance measurement positions I1, I2, I3, and I4, and perform the keystone correction based on the measurement results such that the respective distance measurement positions I1 to I4 become four corners. In this case, the distance measurement positions I1, I2, I3, and I4 are converted into corrected positions I1', I2', I3', and I4', respectively.

<Relationship between Position Correction and Focal Length>

Meanwhile, in a position correction on a two-dimensional plane as in the position correction in the XY directions, the processing accuracy is likely to decrease when the workpiece W having a height is set as a processing target.

For example, a focal position of near-infrared laser light is different between the vicinity of the center of the processing area R1 set on the workpiece W and the vicinity of an edge of the processing area R1 when two-dimensional scanning is performed by the laser light scanning section 4. Specifically, the focal position becomes more distant from the processing area R1 as proceeding toward the edge from the central portion of the processing area R1. Therefore, the focal position is likely to deviate after the correction in the position correction on the two-dimensional plane. This is problematic in terms of maintaining high processing accuracy.

For example, as illustrated in FIG. 19, it is considered a case where a first workpiece W1 whose focal position Df has been optimized and a second workpiece W2 misaligned in the XY directions with respect to the first workpiece W1 are irradiated with near-infrared laser light.

Here, when assuming that an irradiation position of the near-infrared laser light has moved from S1 to S2 as a result of correcting the misalignments in the XY directions in the second workpiece W2, the focal position Df optimized for the first workpiece W1 is shifted by ΔD from the surface of the second workpiece W2. If the focal position is shifted, it is inconvenient in terms of maintaining high processing accuracy.

In regard to this, according to this embodiment, the laser processing apparatus L can detect the misalignments of the workpiece W' in the XY directions using the position correction section 108 and correct the distance measurement position I based on the detection results as illustrated in Step S306 of FIG. 16. Further, the laser processing apparatus L corrects the focal position based on the measurement result of the distance measurement section 103 in the state where the distance measurement position I has been corrected by the position correction section 108 prior to the irradiation of the workpiece W' with the laser light as illustrated in Step S311 of FIG. 16.

In this manner, the high processing accuracy can be maintained even if the workpiece W' is misaligned with the configuration in which the focal position is adjusted in the state where the misalignment of the workpiece W' has been corrected.

As illustrated in Step S105 of FIG. 16, the control section 101 executes the two-dimensional scanning in consideration of the misalignment. This is advantageous in terms of maintaining the high processing accuracy of the workpiece W'.

As illustrated in FIG. 17D, the distance measurement position I associated with the printing block B can be corrected by correcting the position of the printing block B using the search result of the pattern search. This is advantageous in terms of maintaining the high processing accuracy of the workpiece W'.

As illustrated in FIG. 17A and the like, the distance measurement position I is set more appropriately by setting the distance measurement position I in the printing block B, and as a result, it is advantageous in terms of maintaining the high processing accuracy of the workpiece W'.

OTHER EMBODIMENTS

In the above embodiment, the characteristic amount extraction section 105 is configured to directly use the captured image Pw in the pattern area Rp as the image information of the captured image Pw, but the present disclosure is not limited to this configuration. The characteristic amount extraction section 105 can also use edge information of the captured image Pw in the pattern area Rp as the image information of the captured image Pw.

Further, the distance measurement position I is set per printing block B in the above-described embodiment, but a method for setting the distance measurement position I can be changed as appropriate. For example, the distance measurement position I may be set as a relative coordinate with respect to the printing block B, or the distance measurement position I may be set as a relative coordinate with respect to the pattern area Rp or the search area Rs. Alternatively, the distance measurement position I can be set as absolute coordinates irrelative to any of the printing block B, the pattern area Rp, and the search area Rs.

What is claimed is:

1. A laser processing apparatus comprising:
   an excitation light generation section that generates excitation light;
   a laser light output section that generates laser light based on the excitation light generated by the excitation light generation section and emits the laser light;
   a focus adjustment section that adjusts a focal position of the laser light emitted from the laser light output section;
   a laser light scanning section that irradiates a workpiece with the laser light whose focal position has been adjusted by the focal adjustment section and performs two-dimensional scanning within a processing area set on a surface of the workpiece;
   an imaging section that captures the workpiece, without the laser light scanning section, to generate a captured image including at least a part of the processing area;
   a setting section that sets each of a correction area for identification of a position of the workpiece and a distance measurement position for measurement of a distance to the surface of the workpiece on the captured image generated by the imaging section;
   a storage section that stores image information in the correction area set by the setting section;
   a position correction section that detects a misalignment of a new workpiece using the image information stored in the storage section on a captured image newly generated by the imaging section for the new workpiece different from the workpiece used to set the correction area, and corrects, based on a detection result of the misalignment, a distance measurement position on the new workpiece corresponding to the distance measurement position set by the setting section;
   a distance measuring light emitting section that emits distance measuring light for measurement of a distance from the laser processing apparatus to a surface of the new workpiece;
   a scanning control section that controls the laser light scanning section such that the distance measurement position corrected by the position correction section is irradiated with the distance measuring light emitted by the distance measuring light emitting section;
   a distance measuring light receiving section that receives the distance measuring light which has been reflected on the surface of the new workpiece and returned via the laser light scanning section; and
   a distance measurement section that measures a distance from the laser processing apparatus to the distance measurement position corrected by the position correction section based on a light reception position of the distance measuring light in the distance measuring light receiving section,
   wherein the focus adjustment section adjusts a focal position based on a measurement result of the distance measurement section prior to irradiation of the new workpiece with the laser light.

2. The laser processing apparatus according to claim 1, wherein
   the scanning control section controls the laser light scanning section so as to perform two-dimensional scanning in consideration of the misalignment detected by the position correction section.

3. The laser processing apparatus according to claim 1, further comprising
a processing block setting section that sets a processing block, which indicates a position of a processing pattern formed within the processing area and is associated with the distance measurement position, to overlap with the captured image,
wherein the position correction section corrects a position of the processing block based on the detection result of the misalignment.

4. The laser processing apparatus according to claim 3, wherein
the setting section sets the distance measurement position within the processing block.

5. The laser processing apparatus according to claim 1, wherein
the imaging section includes at least one of
a first imaging section which has an imaging optical axis branching from a laser light path from the laser light output section to the laser light scanning section and generates the captured image with the laser light scanning section, and
a second imaging section which has an imaging optical axis independent of the laser light path and generates the captured image without the laser light scanning section, and
the position correction section corrects the distance measurement position based on a captured image newly generated by the at least one of the first and second imaging sections.

6. The laser processing apparatus according to claim 5, wherein
the second imaging section generates the captured image having wider field of view than the image generated by the first imaging section.

7. The laser processing apparatus according to claim 5, further comprising:
a controller in which the excitation light generation section is provided;
a head in which the laser light output section, the focus adjustment section, the laser light scanning section and the second imaging section are provided; and an optical fiber cable by which the controller and the head are optically coupled.

* * * * *